(12) United States Patent
Suzuki et al.

(10) Patent No.: US 6,665,131 B2
(45) Date of Patent: Dec. 16, 2003

(54) IMAGING OPTICAL SYSTEM

(75) Inventors: Kenzaburo Suzuki, Yokohama (JP); Hidenobu Harada, Ichikawa (JP)

(73) Assignee: Nikon Corporation, Tokyo (JP)

( * ) Notice: Subject to any disclaimer, the term of this patent is extended or adjusted under 35 U.S.C. 154(b) by 47 days.

(21) Appl. No.: 09/940,540

(22) Filed: Aug. 29, 2001

(65) Prior Publication Data

US 2002/0048093 A1 Apr. 25, 2002

(30) Foreign Application Priority Data

| Aug. 30, 2000 | (JP) | ................................. | 2000-261362 |
| Dec. 26, 2000 | (JP) | ................................. | 2000-395274 |
| Aug. 22, 2001 | (JP) | ................................. | 2001-251972 |
| Aug. 22, 2001 | (JP) | ................................. | 2001-251980 |

(51) Int. Cl.$^7$ ................................. G02B 9/36
(52) U.S. Cl. ................ 359/778; 359/776; 359/775; 359/772; 359/754
(58) Field of Search ................ 359/680, 682, 359/739–41, 749, 752–54, 757, 759, 760, 763–69, 771–76, 778, 779

(56) References Cited

U.S. PATENT DOCUMENTS

| 4,057,329 A | * | 11/1977 | Fleischman | ................ 359/778 |
| 4,101,203 A | * | 7/1978 | Yamaguchi | ................ 359/765 |
| 4,364,644 A | * | 12/1982 | Ikemori | ................ 359/713 |
| 4,828,372 A | * | 5/1989 | Betensky et al. | ................ 359/689 |
| 6,147,815 A | | 11/2000 | Fujie | ................ 359/742 |

* cited by examiner

Primary Examiner—Jordan M. Schwartz
Assistant Examiner—Jessica Stultz
(74) Attorney, Agent, or Firm—Miles & Stockbridge P.C.

(57) ABSTRACT

An imaging optical system having superior optical performance with the improved correction of chromatic aberration over a wide wavelength range extending from the visible wavelength range to the infrared wavelength range is provided. According to one aspect, an imaging optical system includes, in order from an object, a front lens group GF with a positive refractive power having at least one lens element, an aperture stop SP and a rear lens group GR with a positive refractive power having at least one lens element. The front lens group GF includes a double convex positive lens GT arranged to the most object side. At least one of the front lens group GF and the rear lens group GR includes a triple cemented lens GS being adjacent to the aperture stop SP having a negative refractive power as a whole composed of a first positive lens, a negative lens, and a second positive lens. Predetermined conditional expression is satisfied.

16 Claims, 13 Drawing Sheets

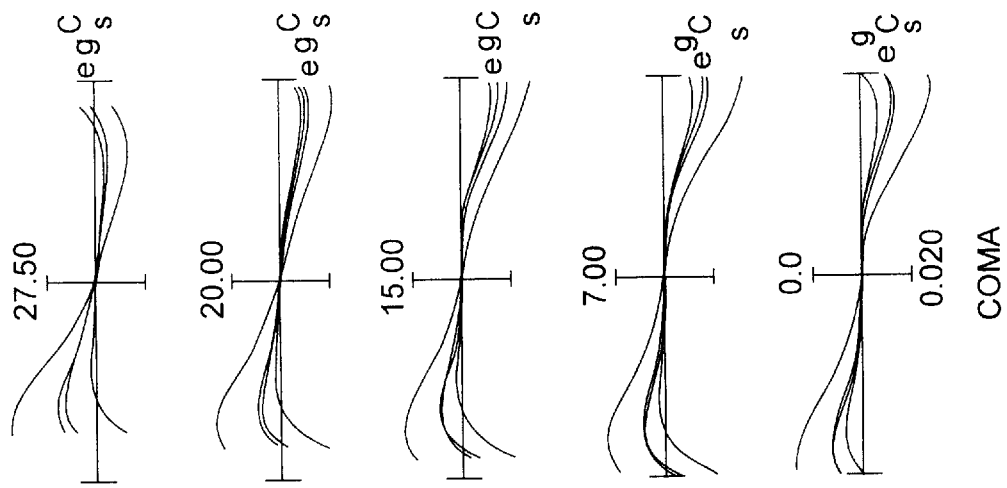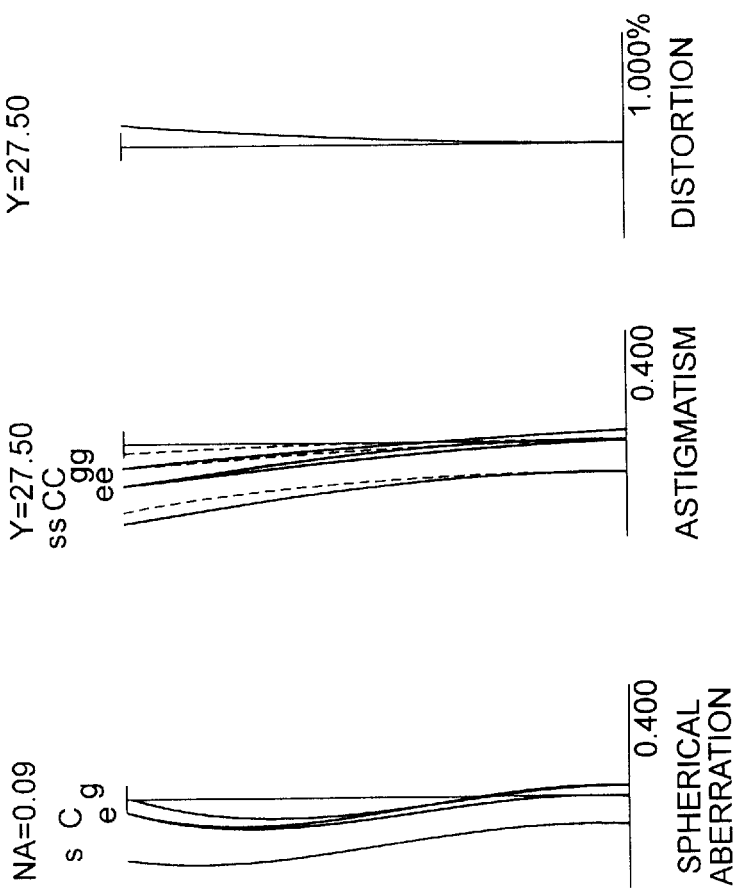

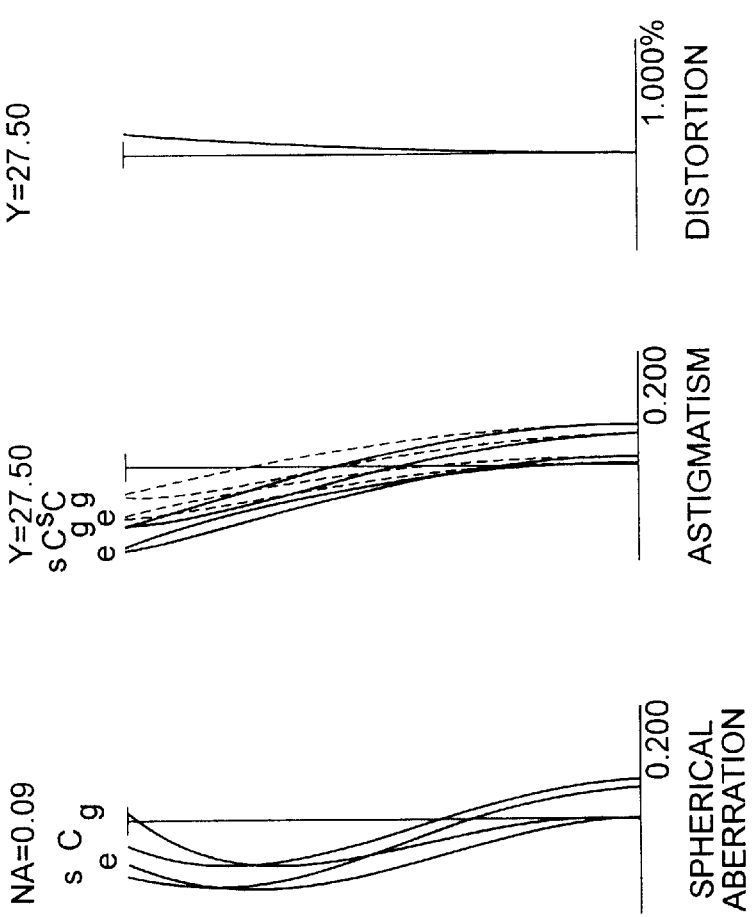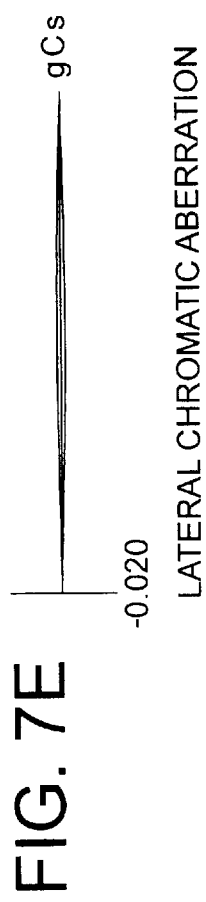

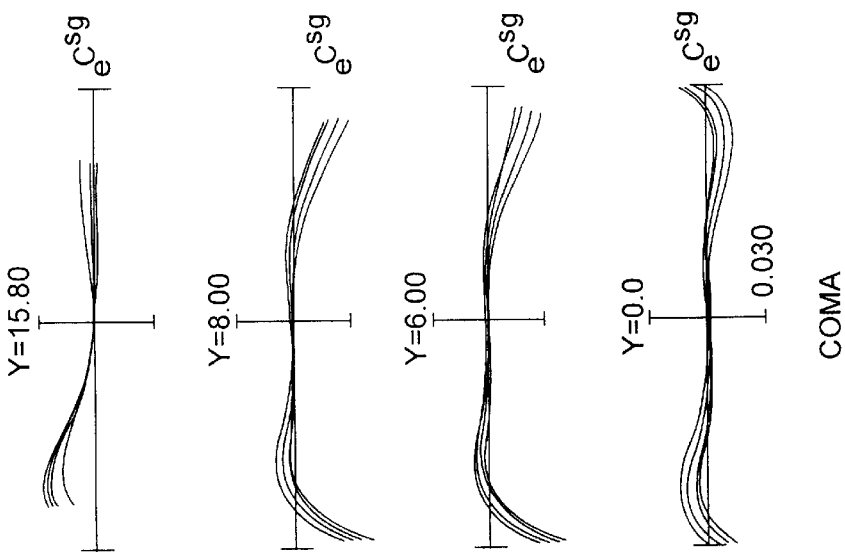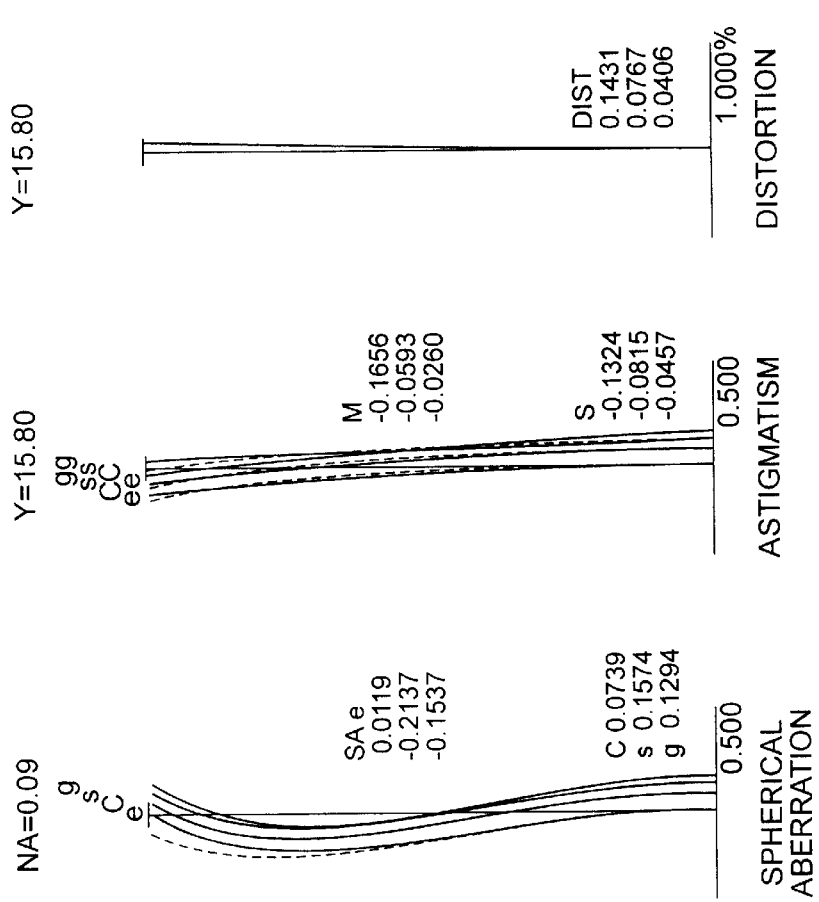

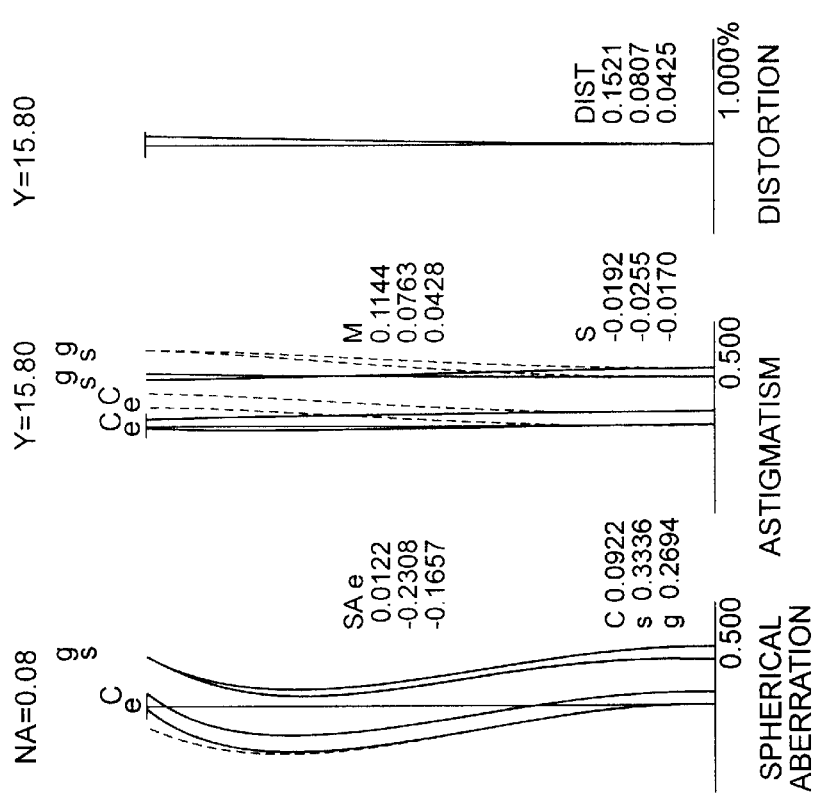

IMAGING OPTICAL SYSTEM

INCORPORATION BY REFERENCE

The disclosures of the following priority applications are incorporated herein by reference:

Japanese Patent Application No. 2000-261362 filed Aug. 30, 2000;

Japanese Patent Application No. 2000-395274 filed Dec. 26, 2000.

Japanese Patent Application No. 2001-251972 filed Aug. 22, 2001;

Japanese Patent Application No. 2001-251980 filed Aug. 22, 2001;

BACKGROUND OF THE INVENTION

1. Field of the Invention

The present invention relates to an imaging optical system capable of forming an image of an object arranged at a finite distance, as in a scanner optical system, and more particularly relates to an imaging optical system having superior optical performance with the improved correction of chromatic aberration over a wide wavelength range extending from the visible wavelength range to the infrared wavelength range.

2. Description of Related Art

An optical system for a scanner requires the ability to faithfully read the information of the original picture or object being scanned. Accordingly, it is necessary to correct various aberrations like spherical aberration for a single color, as well as to satisfactorily correct longitudinal and lateral chromatic aberrations. Longitudinal chromatic aberration increases proportional to the square of the imaging magnification in an optical system that forms the image of an object arranged at a finite distance, such as in an optical system for a scanner. Thus, the correction of chromatic aberration is even more critical.

Generally, it is necessary with an optical system for a scanner to faithfully reproduce the original picture or object in the visible wavelength range. However, it has also become necessary in recent years for such optical system having superior optical performance with the improved correction of chromatic aberration over a wide wavelength range extending from the visible wavelength range to the infrared wavelength range in the vicinity of 850 nm.

With increasing the magnification, longitudinal chromatic aberration increases proportional to the square of the imaging magnification. It becomes difficult to obtain such optical system having superior optical performance, and, in particular, difficult to correct chromatic aberration.

When longitudinal chromatic aberration is not sufficiently corrected, the best focus positions (where the best optical performance on the axis can be obtained) for three-wavelength ranges (red, green, and blue) shift along the optical axis with each other. Accordingly, when a CCD is arranged at the best focus position for a blue wavelength range, sufficient optical performance may not be obtained for a green wavelength range.

On the other hand, when lateral chromatic aberration is not sufficiently corrected, the height from the optical axis where the image of an original is formed varies in accordance with the wavelength. Accordingly, the image of the original is recorded with different dimension in each wavelength.

Image information recorded on a film is observed in a state magnified and projected on a printing paper or the like. Therefore, when image information recorded on a film is input to a computer by means of a photoelectric converter or the like, a scanner optical system is required to have a high resolving power. Since a scanner optical system actually has a high resolving power, the high resolving power permits recording even a minute dust on a film as image information.

In this case, the minute dust on the film can be detected by using, for example, near infrared wavelength range. With removing the detected image of the dust from the image information by means of electrical processing, the image information recorded on the film can be input excellently even a dust is stuck on the film.

However, in a scanner optical system up to now, chromatic aberration for near infrared wavelength has not been sufficiently corrected, so that when a dust stuck on a film is detected with near infrared wavelength, the image of the dust being recorded by a photoelectric converter becomes blurred. As a result, with removing the dust image from image information obtained with red, green and blue wavelength regions, the effect of removing the dust image is not sufficient, so that it is inconvenient that image information cannot be input excellently.

SUMMARY OF THE INVENTION

The present invention is made in view of the aforementioned problem and has an object to provide an imaging optical system capable of forming an image of an object arranged at a finite distance having superior optical performance with the improved correction of chromatic aberration over a wide wavelength range extending from the visible wavelength range to the infrared wavelength range.

According to one aspect of the present invention, an imaging optical system includes, in order from an object, a front lens group with a positive refractive power having at least one lens element, an aperture stop, and a rear lens group with a positive refractive power having at least one lens element. The front lens group includes a double convex positive lens arranged to the most object side. At least one of the front lens group and the rear lens group includes a triple cemented lens being adjacent to the aperture stop having a negative refractive power as a whole composed of a first positive lens, a negative lens, and a second positive lens. The following conditional expression is satisfied;

$$0.3<|fs|/f<5.0 \qquad (1)$$

where fs denotes the focal length of the cemented lens at e-line ($\lambda$=546.07 nm) and f denotes the focal length of the imaging optical system at e-line ($\lambda$=546.07 nm).

In one preferred embodiment of the present invention, the cemented lens has a positive lens made of a glass material having Abbe number vd of 65 or more and also the partial dispersion ratio P of 0.8 or more. The cemented lens has a meniscus lens arranged closest to the aperture stop having a strong powered surface facing to the opposite side of the space where the aperture stop exists. The following conditional expression is satisfied;

$$0.1<LD/(|\beta| \cdot f)<4 \qquad (2)$$

where LD denotes the total sum of the thickness along the optical axis of the positive lenses made of the glass material having Abbe number vd of 65 or more and also the partial dispersion ratio P of 0.8 or more, P denotes the partial dispersion ratio (ng−ne)/(nF−nC), ng denotes refractive index at g-line (λ=435.84 nm), ne denotes refractive index at e-line (λ=546.07 nm), nF denotes refractive index at F-line (λ=486.13 nm), nC denotes refractive index at C-line (λ=656.27 nm), and β denotes the imaging magnification of the imaging optical system at e-line (λ=546.07 nm).

In one preferred embodiment of the present invention, at least two positive lenses, whose glass material has Abbe number νd of 65 or more and also the partial dispersion ratio P of 0.8 or more, are arranged to both object side and image side of the aperture stop. The following conditional expressions are satisfied;

$$0.03 < \Phi R/(|\beta| \cdot |fs|) < 3 \quad (3)$$

$$-0.01 < LA/f < 0.01 \quad (4)$$

where ΦR denotes the effective diameter of the most-image-side lens, and LA denotes an amount of longitudinal chromatic aberration of the imaging optical system at s-line (λ=852.11 nm) as measured with respect to an e-line reference wavelength.

In one preferred embodiment of the present invention, a first and a second cemented lenses having a negative refractive power as a whole are arranged adjacent to both sides of the aperture stop. Each of the first cemented lens and the second cemented lens is a triple cemented lens composed of a first positive lens, a negative lens, and a second positive lens. The most aperture stop side lens of each cemented lens is a positive meniscus lens. The following conditional expression is satisfied;

$$0.5 < fs1/fs2 < 3.0 \quad (5)$$

where fs1 denotes the focal length at e-line (λ=546.07 nm) of the first cemented lens arranged to the object side of the aperture stop and fs2 denotes the focal length at e-line (λ=546.07 nm) of the second cemented lens arranged to the image side of the aperture stop.

According to another aspect of the present invention, an imaging optical system includes, in order from an object, a front lens group having a positive refractive power, an aperture stop, and a rear lens group having a positive refractive power. The front lens group includes, in order from the object, a first lens element having a positive refractive power, and a second lens element having a negative refractive power cemented with at least two lens elements composed of positive and negative lenses wherein the second lens element has a meniscus shape having a concave surface facing to the image side. The rear lens group includes, in order from the object, a third lens element having a negative refractive power cemented with at least two lens elements composed of positive and negative lenses wherein the third lens element has a meniscus shape having a concave surface facing to the object side, and a fourth lens element having a positive refractive power with a meniscus shape having a concave surface facing to the object side. The following conditional expressions are satisfied;

$$-0.01 < RSA/f < 0.01 \quad (9)$$

$$-0.0085 < LAM/f < 0.0085 \quad (10)$$

where RSA denotes the maximum value of spherical aberration at e-line, LAM denotes the maximum value of longitudinal chromatic aberration of the imaging optical system between 435.8 nm and 1014 nm as measured with respect to an e-line reference wavelength, and f denotes the focal length of the imaging optical system at e-line.

In one preferred embodiment of the present invention, a positive lens made of a glass material satisfying the following conditional expressions is used at least at one position among the two lens groups between which the aperture stop of the imaging optical system is located;

$$65 < \nu \quad (11)$$

$$1.40 < nd < 1.65 \quad (12).$$

where νd denotes Abbe number and nd denotes refractive index at d-line (λ=587.6 nm).

In one preferred embodiment of the present invention, a negative lens made of a glass material satisfying the following conditional expressions is used at least at one position among the two lens groups between which the aperture stop of the imaging optical system is located;

$$35 < \nu d < 45 \quad (13)$$

$$1.60 < nd < 1.70 \quad (14)$$

where νd denotes Abbe number and nd denotes refractive index.

In one preferred embodiment of the present invention, when the second lens element is composed of three lens elements, the following conditional expression is satisfied;

$$0 < -f2b/f < f2a/f < f2c/f \quad (15)$$

where f2a denotes the focal length of a lens element at e-line located to the most object side of the second lens element, f2b denotes the focal length of a lens element at e-line located at the middle of the second lens element, f2c denotes the focal length of a lens element at e-line located to the most image side of the second lens element, and f denotes the focal length of the imaging optical system at e-line.

BRIEF DESCRIPTION OF THE DRAWINGS

FIGS. 5A through 5E are graphs showing various aberrations of the imaging optical system according to Example 2.

FIGS. 7A through 7E are graphs showing various aberrations of the imaging optical system according to Example 3.

FIGS. 9A through 9E are graphs showing various aberrations of the imaging optical system according to Example 4.

FIGS. 13A through 13E are graphs showing various aberrations of the imaging optical system according to Example 6.

DESCRIPTION OF THE PREFERRED EMBODIMENTS

Figure 1:
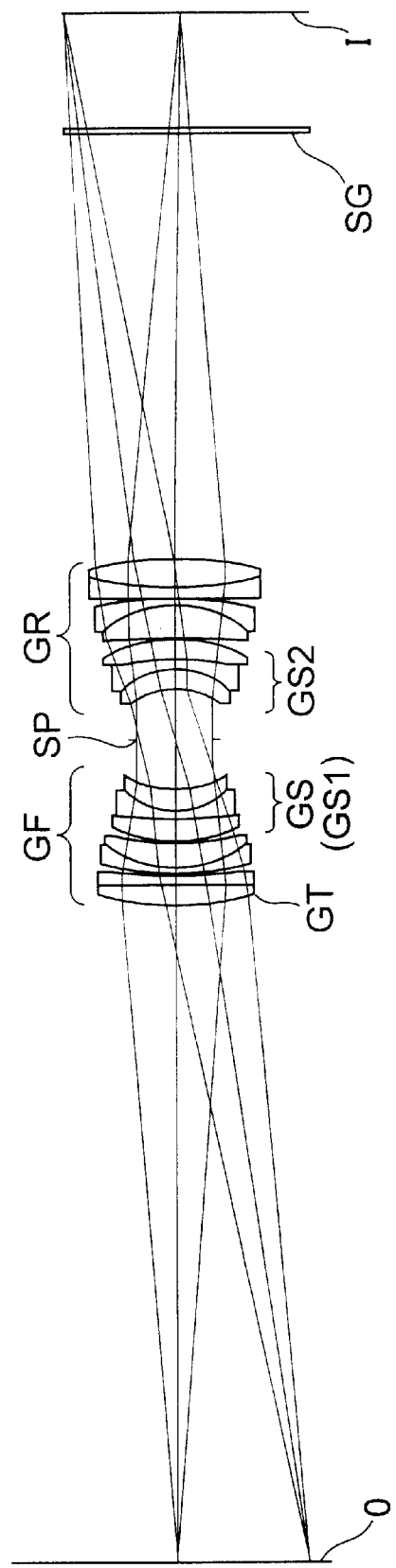
FIG. 1 is a drawing showing the lens construction of an imaging optical system according to Example 1 of the present invention.

An embodiment of the present invention is explained below. FIG. 1 is a drawing showing the lens construction of an imaging optical system according Example 1 of the present invention. As shown in FIG. 1, the imaging optical system according to the Example 1 of the present invention includes a front lens group GF having a plurality of lenses, and an aperture stop SP. A triple cemented lens composed of a first positive lens, a negative lens, and a second positive lens is arranged to the object side of the aperture stop SP. A double convex positive lens is arranged to the most object side.

The fundamental construction of this optical system has the construction that each lens element is arranged almost symmetrically with respect to the aperture stop SP. The cemented lens has a meniscus lens arranged closest to the aperture stop SP facing a strong powered surface facing to the opposite side of the space where the aperture stop SP exists. Accordingly, spherical aberration can be corrected satisfactory.

Figure 2:
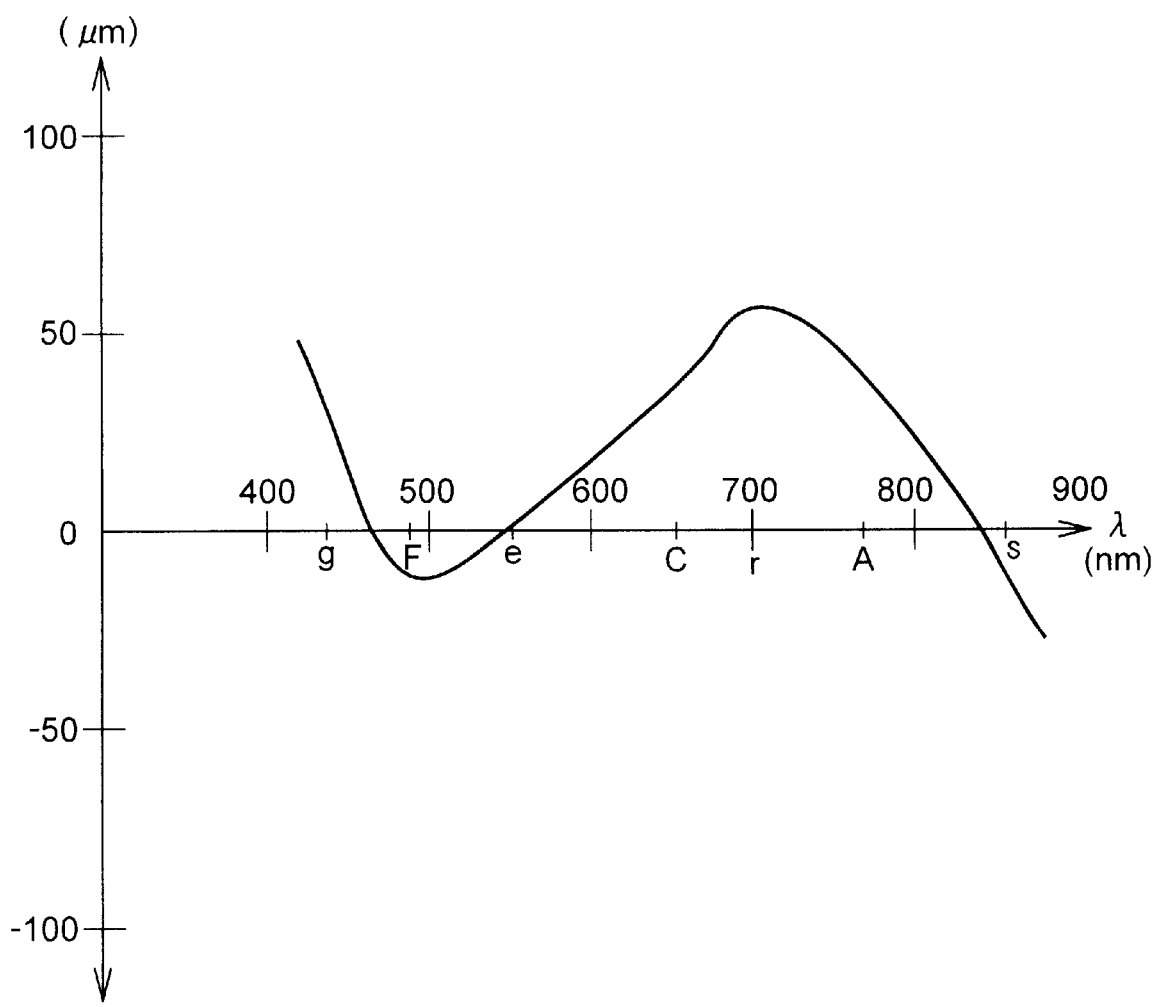
FIG. 2 is a graph showing a typical longitudinal chromatic aberration of an imaging optical system according to the present invention.
Figure 3:
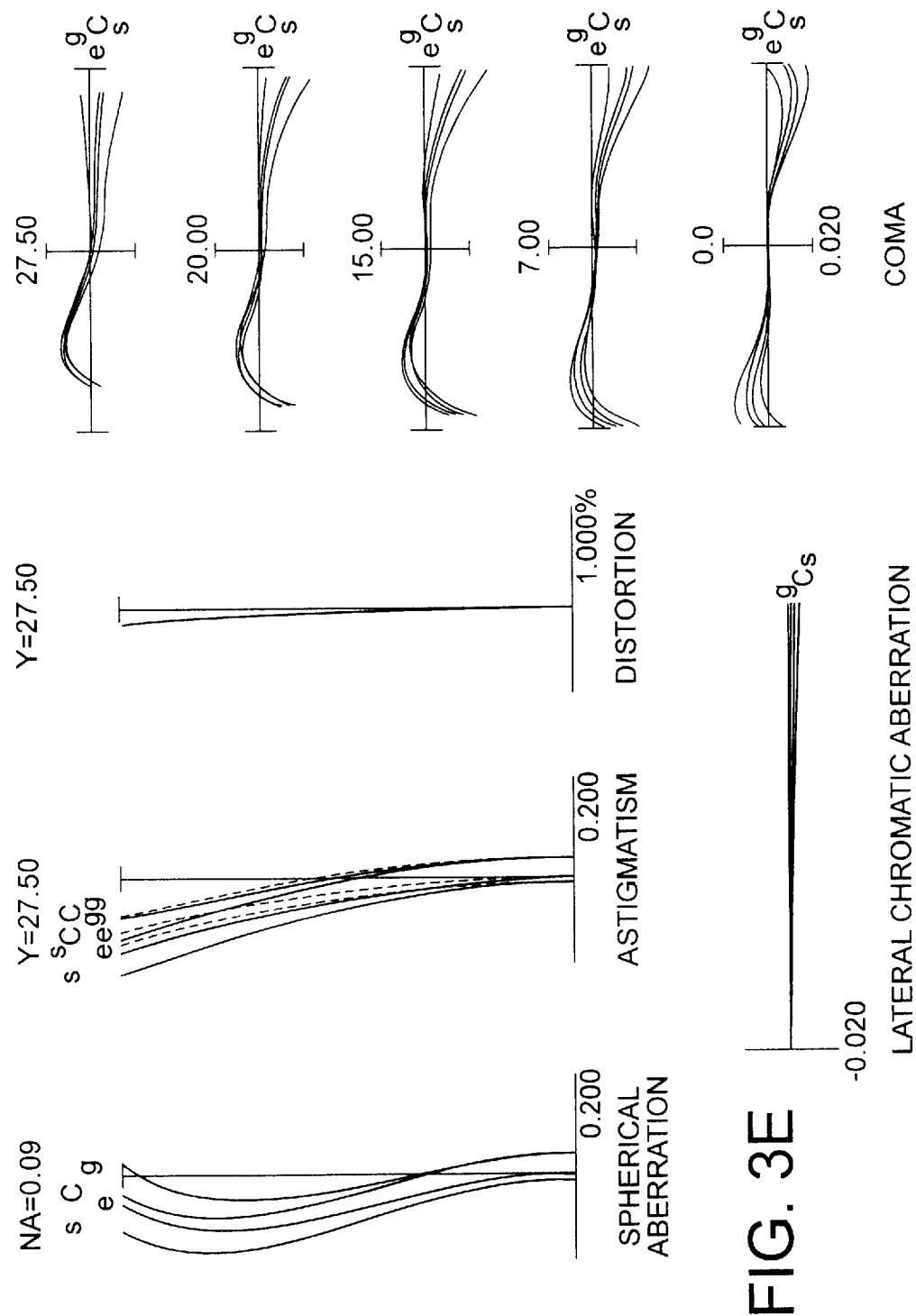
FIGS. 3A through 3E are graphs showing various aberrations of the imaging optical system according to Example 1 of the present invention

FIG. 2 is a graph showing a typical longitudinal chromatic aberration of an imaging optical system according to the Example 1 of the present invention. In FIG. 2, g denotes g-line ($\lambda$=435.84 nm), F denotes F-line ($\lambda$=486.13 nm), e denotes e-line ($\lambda$=546.07 nm), C denotes C-line ($\lambda$=656.27 nm), r denotes r-line ($\lambda$=706.52 nm), A denotes A-line ($\lambda$=768.20 nm), and s denotes s-line ($\lambda$=852.11 nm).

As is apparent from the figure, longitudinal chromatic aberration in the infrared wavelength range up to near 850 nm as well as in the visible wavelength range from near 400 nm to 700 nm is corrected satisfactory.

Moreover, in the present invention, it is preferable to satisfy the following conditional expression (1):

$$0.3 < |fs|/f < 5.0 \quad (1)$$

where fs denotes the focal length of the cemented lens GS, and f denotes the focal length of the imaging optical system.

Conditional expression (1) defines an appropriate range of the focal length of the cemented lens GS. This conditional expression (1) is particularly effective to the sufficient correction of chromatic aberration including the infrared wavelength range. The cemented lens GS is quite effective when arranging at least one side of the aperture stop SP. If the cemented lens GS is arranged both sides of the aperture stop SP, more preferable effect is obtained. When the cemented lenses are arranged both sides of the aperture stop SP as Example 1 or 2 described later, fs is to indicate the one whose refractive power is stronger than the other (namely, the one which has smaller |fs|).

When the ratio |fs|/f exceeds the upper limit of conditional expression (1), the refractive power of the cemented lens becomes too weak, so that it causes a problem that the back focal length is liable to become too short. Moreover, spherical aberration is liable to have negative value, so that the superior imaging performance cannot be obtained. On the other hand, when the ratio falls below the lower limit of conditional expression (1), the refractive power of the cemented lens becomes too strong, so that the Petzval sum is liable to take a large negative value. As a result, curvature of field becomes too strong, so that it is undesirable to be liable to lose the balance of aberrations.

In addition, when the upper limit is set to 3.0 and the lower limit is set to 1.0, it is more preferable that even better optical performance of the present invention can be expected.

Moreover, in the present invention, the cemented lens has a positive lens made of a glass material having Abbe number vd of 65 or more, and the partial dispersion ratio P of 0.8 or more. The cemented lens has a meniscus lens arranged closest to the aperture stop having a largest curvature surface away from the space where the aperture stop SP exists. It is desirable that the following conditional expression (2) is satisfied;

$$0.1 LD/(|\beta| \cdot f) < 4 \quad (2)$$

where LD denotes the total sum of the thickness along the optical axis of the positive lenses made of the glass material having Abbe number vd of 65 or more and also the partial dispersion ratio P of 0.8 or more, P denotes the partial dispersion ratio (ng−ne)/(nF−nC), ng denotes refractive index at g-line ($\lambda$=435.84 nm), ne denotes refractive index at e-line ($\lambda$=546.07 nm), nF denotes refractive index at F-line ($\lambda$=486.13 nm), nC denotes refractive index at C-line ($\lambda$=656.27 nm), and $\beta$ denotes the imaging magnification of the imaging optical system at e-line.

Conditional expression (2) defines an appropriate range of the total sum of the thickness, along the optical axis, of the glass material having anomalous dispersion used in the optical system relative to the used magnification of the optical system. It is effective for correcting chromatic aberration sufficiently and, in particular, for correcting aberrations even in the infrared wavelength range. Moreover, in combination with arranging a cemented lens having triple cemented construction in the vicinity of the aperture stop, more superior optical imaging performance can be obtained.

In this case, it is necessary for the glass material to have anomalous dispersion. It is particularly important to correct aberrations even in the infrared wavelength range. Here, the anomalous dispersion is explained briefly.

The ratio of two partial dispersion (difference of refractive index at two wavelengths) of an optical glass is called as the partial dispersion ratio P, and defined by the following expression:

$$P=(ng-ne)/(nF-nC).$$

When the partial dispersion ratio P and Abbe number vd are plotted in the vertical and horizontal direction, respectively, a glass material having shifted coordinates from the standard glass materials is called anomalous dispersion glass. To give an actual example, crown glass K7 and flint glass F2 of Schott Glas are typical glass materials of standard glass. A glass having a large shift from the line connected the coordinates of the two glass materials is called anomalous dispersion glass.

In the present invention, to correct chromatic aberration sufficiently, it is quite effective that a glass material having Abbe number of 65 or more and also the partial dispersion ratio P of 0.8 or more is applied to positive lenses in the optical system. Moreover, when the total thickness of the positive lenses has a predetermined value, a desirable system design in which the correction of chromatic aberration and the cost of manufacturing are well balanced is obtained.

When the value LD/(|β|·f) exceeds the upper limit of conditional expression (2), a glass material having anomalous dispersion has to be used in large quantities, so that it is undesirable that the cost of manufacturing increases. On the other hand, when the value falls below the lower limit of conditional expression (2), it is undesirable that the correction of chromatic aberration is liable to become insufficient.

In addition, when the upper limit is set to 1.5 and the lower limit is set to 0.2, it is more preferable that even better optical performance of the present invention can be expected. Moreover, when the partial dispersion ratio P is set to be 0.95 or more, even better optical performance of the present invention can be expected. Furthermore, in order to keep the Petzval sum small for maintaining flatness of the image plane, it is desirable that refractive index nd of the glass material used for the positive lenses, which has Abbe number vd of 65 or more and the partial dispersion ratio P of 0.8 or more, is set to be 1.58 or more.

In the Example 1, at least two positive lenses, whose glass material has Abbe number vd of 65 or more and the partial dispersion ratio P of 0.8 or more, are arranged to both object side and image side of the aperture stop. The following conditional expressions (3) and (4) are preferably satisfied;

$$0.03 < \Phi R/(|\beta|\cdot|fs|) < 3 \quad (3)$$

$$-0.01 < LA/f < 0.01 \quad (4)$$

where ΦR denotes the effective diameter of the most-image-side lens, and LA denotes an amount of longitudinal chromatic aberration of the imaging optical system at s-line (λ=852.11 nm) as measured with respect to an e-line reference wavelength.

Conditional expression (3) defines an appropriate range of the diameter of the most-image-side lens with respect to the used magnification of the optical system so as to provide sufficient peripheral quantity of light by selectively passing light flux and preferable correction of aberrations.

When the value ΦR/(|β|·|fs|) exceeds the upper limit of conditional expression (3), the effective diameter becomes excessively large, so that unnecessary light is liable to enter. As a result, it causes not only degradation of imaging quality but also that the diameter of the optical system tens to become too large, so that the whole system becomes large and, as a result, the manufacturing cost tens to increase. Moreover, it becomes difficult to correct coma, so that desirable imaging performance cannot be obtained.

On the other hand, when the value falls below the lower limit of conditional expression (3), since sufficient angle of view cannot be obtained, the total lens length tends to become long. Moreover, it causes not only that the peripheral quantity of light cannot be obtained but also that degradation of resolution caused by diffraction tends to happen.

In addition, when the upper limit is set to 0.5 and the lower limit to 0.1, it is more preferable that even better optical performance of the present invention can be expected.

As described above, at least two positive lenses, whose glass material has Abbe number vd of 65 or more and the partial dispersion ratio P of 0.8 or more, are arranged to both object side and image side of the aperture stop, so that more preferable correction of chromatic aberration can be obtained. Furthermore, when the partial dispersion ratio P is 0.95 or more, even better optical performance of the present invention can be expected.

Conditional expression (4) is important for realizing good balance of chromatic aberration in the imaging optical system including the infrared wavelength range up to 850 nm.

In the Example 1 of the present invention, with the lens construction described above, longitudinal chromatic aberration can be corrected well as S-shape shown in FIG. 2 when plotting longitudinal chromatic aberration in vertical axis and the wavelength in horizontal axis. As a result, longitudinal chromatic aberration can be corrected well beyond the visible light range (from 400 nm to 700 nm) up to the infrared wavelength range near 850 nm.

When the ratio LA/f exceeds the upper limit of conditional expression (4), longitudinal chromatic aberration tends to be overcorrected in the wavelength range of 700 nm to 850 nm. On the other hand, when the ratio falls below the lower limit of conditional expression (4), longitudinal chromatic aberration tends to be under-corrected in the wavelength range of 700 nm to 850 nm.

In addition, when the upper limit is set to 0.001 and the lower limit to −0.0015, it is more preferable that even better optical performance of the present invention can be expected.

Moreover, in the Example 1, although the cemented lens GS may be arranged at least one side, object side or image side, of the aperture stop SP as described above, even better optical performance can be obtained when arranging both sides of the aperture stop. This explanation is described below.

The imaging optical system includes cemented lenses GS1 and GS2 to the object side and the image side of the aperture stop, respectively, each having a negative refractive power, and each composed of three lenses, a first positive lens, a negative lens, and a second positive lens. Each cemented lens has a positive meniscus lens located closest to the aperture stop. This lens construction is quite effective to obtain higher optical performance. Furthermore, the refractive power is preferably satisfied the following conditional expression (5);

$$0.5 < fs1/fs2 < 3.0 \quad (5)$$

where fs1 denotes the focal length of the cemented lens GS1 arranged to the object side of the aperture stop, fs2 denotes the focal length of the cemented lens GS2 arranged to the image side of the aperture stop.

Conditional expression (5) defines an appropriate range of the ratio of the focal length of the cemented lens GS1 arranged to the object side of the aperture stop relative to that of GS2 arranged to the image side.

When the ratio exceeds the upper limit of conditional expression (5), the focal length of GS2 becomes relatively too small, so that the total lens length tends to become too long. Moreover, the curvature of field tends to bend to positive direction, so that it is undesirable that upper coma, located higher than the principal ray, becomes difficult to be corrected. On the other hand, when the ratio falls below conditional expression (5), the focal length of GS1 becomes relatively too small, so that it is undesirable that spherical aberration tends to becomes too large in positive direction. Moreover, it is undesirable that lower coma, located lower than the principal ray, becomes difficult to be corrected.

In addition, when the upper limit is set to 2.0 and the lower limit to 1.0, it is more preferable that even better optical performance of the present invention can be expected.

To obtain superior imaging performance, it is desirable to satisfy at least one of the following conditional expressions;

$$0.5 < fT/f < 10.0 \quad (6)$$

$$0.3 < |RF/RR| < 2.0 \quad (7)$$

$$RF > 0, RR < 0$$

$$Nu < 1.52 \quad (8)$$

where RF denotes the radius of curvature to the most image side of the cemented lens GS1, RR denotes the radius of curvature to the most object side of the cemented lens GS2, Nu denotes the lowest refractive index, at c-line, of a lens used in the cemented lenses GS1 or GS2, and fT denotes the focal length of the positive lens located to the most object side of the imaging optical system.

Conditional expression (6) defines an appropriate range of the focal length of the double convex positive lens located to the most object side of the imaging optical system. In an optical system capable of forming an image of an object arranged at a finite distance such as the present invention, it is very important condition to obtain superior imaging performance. In particular, it is quite effective for correcting coma lower than the principal ray. Moreover, to preferably correct chromatic aberration, the double convex positive lens may be constructed by a cemented lens composed of a double convex positive lens having Abbe number of 60 or more and a negative lens having Abbe number of 40 to 60.

When the ratio fT/f exceeds the upper limit of conditional expression (6), fT becomes too large, so that it causes not only that coma lower than the principal ray cannot be corrected sufficiently, but also that curvature of field tends to produce in positive direction. On the other hand, when the ratio falls below the lower limit of conditional expression (6), fT becomes too small, so that it causes a problem that spherical aberration tends to produce in large quantity. Moreover, it tends to be difficult to secure the back focal length.

In addition, when the upper limit is set to 3.0 and the lower limit to 0.6, it is more preferable that even better optical performance of the present invention can be expected. To obtain even better optical performance of the present invention, it is preferable that the negative lens composing the cemented lens has Abbe number of more than 55 and less than 60. Furthermore, it is preferable for superior imaging performance to use the imaging magnification between −0.5 and −1.5.

Conditional expression (7) defines an appropriate range of the radius of curvature RF and that of RR of the lenses, wherein the respective lenses are arranged to the object side and image side of the aperture stop, respectively, placing the aperture stop in between. This conditional expression (7) is very important for correcting curvature of field sufficiently.

When the ratio |RF/RR| exceeds the upper limit of conditional expression (7), the refractive power of RF becomes too strong, so it is undesirable that curvature of field produces largely to positive direction. In addition, it causes another drawback that the total lens length tends to become long. On the other hand, when the ratio falls below the lower limit of conditional expression (7), spherical aberration becomes large to positive direction, so that image contrast tends to become worse. Moreover, it causes a problem that coma tens to produce on a ray upper than the principal ray.

In addition, when the upper limit is set to 1.3 and the lower limit to 0.7, it is more preferable that even better optical performance of the present invention can be expected.

Conditional expression (8) defines an appropriate range of the lowest refractive index of a lens used in the cemented lenses GS1 or GS2. This is quite effective for keeping flatness of image plane including the infrared wavelength range.

When the value Nu exceeds the upper limit of conditional expression (8), Petzval sum tends to take large positive value. As a result, the curvature of field produces largely, so that good imaging performance cannot be expected.

When the optical system is actually constructed, it is desirable that the construction described below is applied.

To accomplish superior correction of chromatic aberration, it is desirable that each optical element of the optical system is constructed by a cemented lens having at least one lens element with Abbe number of 65 or more and the partial dispersion ratio P of 0.8 or more. To ensure superior imaging performance over the whole image plane, it is essential to correct monochromatic and chromatic aberration as well as to correct longitudinal chromatic aberration. In addition, it is essential to satisfactory correct lateral chromatic aberration in the periphery of image plane. With applying above described construction, the production of chromatic aberration can be suppressed sufficiently when a ray passes through each optical element.

In order to sufficiently correct lateral chromatic aberration, it is desirable that the positive lenses located the most image side and the most object side are made of low dispersion glass having Abbe number 80 or more and that each positive lens is a cemented lens cemented with a negative lens locating to the aperture stop side. Moreover, it is desirable that each negative lens has Abbe number of 50 or more.

It is desirable that a cemented lens composed of a negative meniscus lens and a positive meniscus lens is arranged to the aperture stop side of each cemented lens. Furthermore, it is desirable that GS1 and GS2 are arranged to the aperture stop side of the cemented lenses.

Making reference to the construction of GS1 and GS2, in all cases, it is desirable that the refractive index of the negative lens is lower than that of the positive lens located in the same cemented lens.

In addition, Abbe number vd of the negative lens is preferably from 40 to 60. Moreover, when anomalous dispersion glass of short flint series is used for one of the negative lenses, even better correction of chromatic aberration can be obtained. In cemented lenses GS1 and GS2, it has been explained that the most aperture stop side lens of each cemented lens is a positive meniscus lens. It is further preferable that Abbe number vd of the positive meniscus lens is 55 or less. Furthermore, it is preferable that the all lenses composing GS1 and GS2 are meniscus lenses whose center of curvature are facing to the aperture stop side.

To correct chromatic aberration in the infrared wavelength range, it is preferable that Abbe number vd of a glass used for even the negative lenses is from 50 to 65. In particular, it is effective to use in GS1 and GS2.

Moreover, to keep flatness of image plane, in other words, to obtain good imaging performance up to the periphery of the image plane, it is important to set Petzval sum within an appropriate range. In the present invention, Petzval sum tends to take negative value by arranging negative lenses with strong refractive power in the vicinity of the aperture stop. In order to prevent this, it is preferable that refractive index of each negative lens composing the triple cemented lens is 1.65 or less.

In order to construct an optical system with high resolving power, it is preferable that the lens surfaces even other than GS1 and GS2 are constructed with concentric surfaces to prevent from producing higher order aberration. In particular, it is desirable that the lens located to the most aperture stop side is a cemented meniscus lens whose center of curvature is facing to the aperture stop.

Moreover, the focusing may be performed by moving the entire optical system along the optical axis, by varying the distance between an object and the optical system, or by varying the distance between the optical system and an imaging device.

In the optical system according to the Example 1 of the present invention, superior correction of chromatic aberration can be obtained when using with the magnification β from −0.3 to −3.0. In addition, when β is set from −0.5 to −1.5, even better optical performance of the present invention can be expected. When β is set to −1.0, the optical system can be a complete symmetrical type.

Moreover, it is effective for eliminating a stray light to arrange fixed stops in front and behind of the aperture stop. In addition, more superior optical performance can be obtained by adding an aspherical surface, a diffractive optical element, a graded index lens, or the like to the optical system according to the present invention.

Imaging optical systems according to numerical examples of the present invention are explained with reference to accompanying drawings. All examples are suitable for a scanner optical system.

EXAMPLE 1

FIG. 1 is a drawing showing the construction of an imaging optical system according to Example 1 of the present invention. The imaging optical system includes, in order from an object O to an image I, a front lens group GF having a positive refractive power, an aperture stop SP, a rear lens group GR having a positive refractive power, and a shield glass SG. The front lens group GF composed of a first lens component having a positive refractive power, a second lens component having a positive refractive power, and a third lens component having a negative refractive power. The rear lens group GR composed of a fourth lens component having a negative refractive power, a fifth lens component having a positive refractive power, a sixth lens component having a positive refractive power.

The first lens component is a cemented lens composed of, in order from the object, a double convex positive lens GT and a double concave negative lens. The second lens component is a cemented lens composed of, in order from the object, a negative meniscus lens having a convex surface facing to the object side, and a positive meniscus lens having a convex surface facing to the object side. The third lens component is a first triple cemented lens GS1 cemented with each other having a negative refractive power composed of, in order from the object, a positive meniscus lens having a convex surface facing to the object side, a negative meniscus lens having a convex surface facing to the object side, and a positive meniscus lens having a convex surface facing to the object side. The fourth lens component is a second triple cemented lens GS2 cemented with each other having a negative refractive power composed of, in order from the object, a positive meniscus lens having a concave surface facing to the object side, a negative meniscus lens having a concave surface facing to the object side, and a positive meniscus lens having a concave surface facing to the object side. The fifth lens component is a cemented lens composed of, in order from the object, a positive meniscus lens having a concave surface facing to the object side, and a negative meniscus lens having a concave surface facing to the object side. The sixth lens component is a cemented lens composed of, in order from the object, a double concave negative lens and a double convex positive lens.

Various values associated with Example 1 are listed in Table 1. In Table 1, the first column denotes an optical surface number counted in order from the object, the second column R denotes a radius of curvature of the optical surface, the third column D denotes a distance to the next optical surface along the optical axis, the fourth through eighth columns n(e), n(g), n(C), n(F), n(s) denote refractive indices of the medium (blank when the medium is air) arranged between the optical surface and the next optical surface at the wavelength of e-line, g-line, C-line, F-line, s-line, respectively, the ninth column vd denotes Abbe number of the medium with respect to an d-line reference, and the last column P denotes the partial dispersion ratio. Focal lengths and magnifications are shown the values at e-line unless otherwise specified used wavelength. By the way, in the following numerical examples, the same symbols of this Example 1 are used.

In the tables for various values, "mm" is generally used for the unit of length. However, since an optical system proportionally enlarged or reduced its dimension can be obtained similar optical performance, the unit is not necessary to be limited to "mm" and any other suitable unit can be used.

The reference symbol LD denotes the total sum of the thickness along the optical axis of the positive lenses made of the glass material having Abbe number vd of 65 or more and also the partial dispersion ratio P of 0.8 or more. In Example 1, it is the sum of the thickness along the optical axis of the first, fourth, fifth, tenth, eleventh, and fourteenth lenses. The same procedure is applied to Examples 2 and 3.

TABLE 1

| Surface | R | D | n(e) | n(g) | n(C) | n(F) | n(s) | vd | P |
|---|---|---|---|---|---|---|---|---|---|
| 0 | | 155.07500 | 1.000000 | | | | | | |
| 1 | 54.61100 | 5.40000 | 1.499260 | 1.505265 | 1.495980 | 1.502013 | 1.492728 | 82.52 | 0.995 |
| 2 | −349.98100 | 1.90000 | 1.518723 | 1.526703 | 1.514322 | 1.522384 | 1.509813 | 64.10 | 0.990 |
| 3 | 147.01500 | 0.20000 | 1.000000 | | | | | | |
| 4 | 64.45500 | 1.90000 | 1.529262 | 1.539627 | 1.523714 | 1.533973 | 1.518217 | 51.35 | 1.010 |
| 5 | 27.25600 | 6.00000 | 1.595274 | 1.604034 | 1.590539 | 1.599279 | 1.585920 | 67.87 | 1.002 |
| 6 | 104.65000 | 0.30000 | 1.000000 | | | | | | |
| 7 | 36.88300 | 5.20000 | 1.595274 | 1.604034 | 1.590539 | 1.599279 | 1.585920 | 67.87 | 1.002 |
| 8 | 143.23900 | 1.90000 | 1.516786 | 1.526319 | 1.511688 | 1.521121 | 1.506685 | 54.55 | 0.931 |
| 9 | 16.65020 | 5.20000 | 1.615215 | 1.625709 | 1.609541 | 1.620007 | 1.603937 | 58.54 | 1.003 |
| 10 | 20.79990 | 12.20000 | 1.000000 | | | | | | |
| 11 | ∞ | 11.70000 | 1.000000 | | | | | | |
| 12 | −19.30050 | 5.10000 | 1.529262 | 1.539627 | 1.523714 | 1.533973 | 1.518217 | 51.35 | 1.010 |
| 13 | −17.00020 | 2.00000 | 1.516786 | 1.526319 | 1.511688 | 1.521121 | 1.506685 | 54.55 | 0.931 |
| 14 | −98.20500 | 5.10000 | 1.595274 | 1.604034 | 1.590539 | 1.599279 | 1.585920 | 67.87 | 1.002 |
| 15 | −33.12300 | 0.30000 | 1.000000 | | | | | | |

TABLE 1-continued

| Surface | R | D | n(e) | n(g) | n(C) | n(F) | n(s) | vd | P |
|---|---|---|---|---|---|---|---|---|---|
| 16 | −121.02900 | 7.10000 | 1.595274 | 1.604034 | 1.590539 | 1.599279 | 1.585920 | 67.87 | 1.002 |
| 17 | −26.53000 | 1.90000 | 1.529262 | 1.539627 | 1.523714 | 1.533973 | 1.518217 | 51.35 | 1.010 |
| 18 | −77.99800 | 0.30000 | 1.000000 | | | | | | |
| 19 | −399.91900 | 1.90000 | 1.518723 | 1.526703 | 1.514322 | 1.522384 | 1.509813 | 64.10 | 0.990 |
| 20 | 89.17300 | 7.20000 | 1.499260 | 1.505265 | 1.495980 | 1.502013 | 1.492728 | 82.52 | 0.995 |
| 21 | −59.70100 | 100.00000 | 1.000000 | | | | | | |
| 22 | ∞ | 0.80000 | 1.520327 | 1.529152 | 1.515556 | 1.524354 | 1.510818 | 58.90 | 1.003 |
| 23 | ∞ | 26.85928 | 1.000000 | | | | | | |

FIGS. 3A through 3E are graphs showing various aberrations (spherical aberration, astigmatism, distortion, lateral chromatic aberration and coma) of the imaging optical system according to Example 1 of the present invention. In each graph, g denotes g-line (λ=435.84 nm), e denotes e-line (λ=546.07 nm), C denotes C-line (λ=656.27 nm), and s denotes s-line (λ=852.11 nm). In the graph showing astigmatism, a solid line indicates a sagittal image plane and a broken line indicates a meridional image plane.

As is apparent from the respective graphs showing various aberrations, excellent correction is made over wide angle of view and superior imaging performance is obtained over wide wavelength range from 400 nm to 850 nm.

EXAMPLE 2

Figure 4:
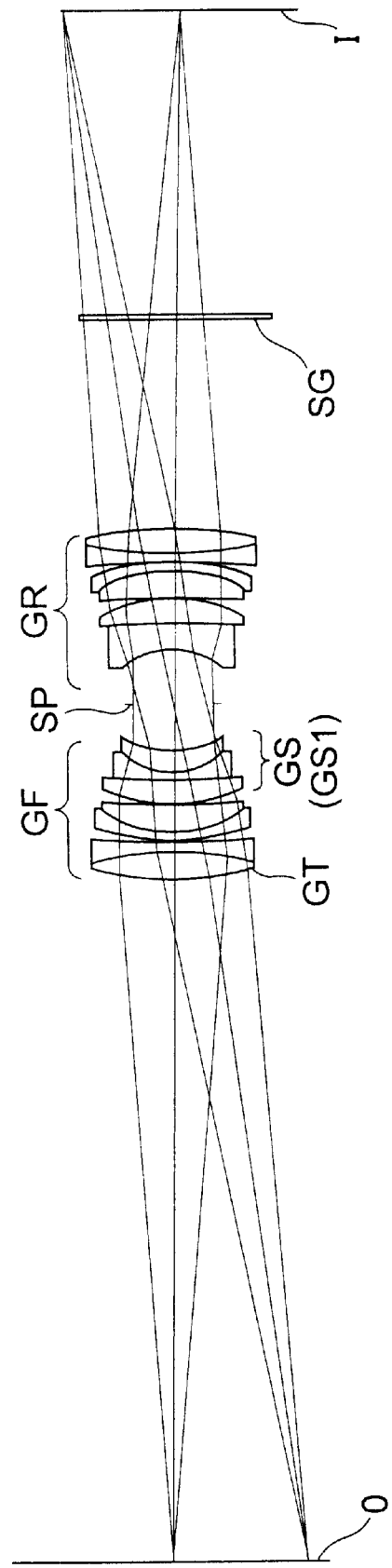
FIG. 4 is a drawing showing the construction of an imaging optical system according to Example 2 of the present invention.

FIG. 4 is a drawing showing the construction of an imaging optical system according to Example 2 of the present invention. The imaging optical system includes, in order from an object O to an image I, a front lens group GF having a positive refractive power, an aperture stop SP, a rear lens group GR having a positive refractive power, and a shield glass SG. The front lens group GF composed of a first lens component having a positive refractive power, a second lens component having a positive refractive power, and a third lens component having a negative refractive power The rear lens group GR composed of a fourth lens component having a negative refractive power, a fifth lens component having a positive refractive power, a sixth lens component having a positive refractive power.

The first lens component is a cemented lens composed of, in order from the object, a double convex positive lens GT and a double concave negative lens. The second lens component is a cemented lens composed of, in order from the object, a negative meniscus lens having a convex surface facing to the object side, and a positive meniscus lens having a convex surface facing to the object side. The third lens component is a first triple cemented lens GS1 cemented with each other having a negative refractive power composed of, in order from the object, a positive meniscus lens having a convex surface facing to the object side, a negative meniscus lens having a convex surface facing to the object side, and a positive meniscus lens having a convex surface facing to the object side. The fourth lens component is a cemented lens composed of, in order from the object, a negative meniscus lens having a concave surface facing to the object side, and a positive meniscus lens having a concave surface facing to the object side. The fifth lens component is a cemented lens composed of, in order from the object, a positive meniscus lens having a concave surface facing to the object side, and a negative meniscus lens having a concave surface facing to the object side. The sixth lens component is a cemented lens composed of, in order from the object, a double concave negative lens and a double convex positive lens.

Various values associated with Example 2 are listed in Table 2.

TABLE 2

| Surface | R | D | n(e) | n(g) | n(C) | n(F) | n(s) | vd | P |
|---|---|---|---|---|---|---|---|---|---|
| 0 | −1.00000 | 161.87720 | 1.000000 | | | | | | |
| 1 | 114.35514 | 6.80000 | 1.499260 | 1.505265 | 1.495980 | 1.502013 | 1.492728 | 82.52 | 0.995 |
| 2 | −56.53694 | 1.90000 | 1.518723 | 1.526703 | 1.514322 | 1.522384 | 1.509813 | 64.10 | 0.990 |
| 3 | 378.20327 | 0.10000 | 1.000000 | | | | | | |
| 4 | 51.04294 | 1.90000 | 1.529262 | 1.539627 | 1.523714 | 1.533973 | 1.518217 | 51.35 | 1.010 |
| 5 | 25.33426 | 7.40000 | 1.595274 | 1.604034 | 1.590539 | 1.599279 | 1.585920 | 67.87 | 1.002 |
| 6 | 139.39757 | 0.10000 | 1.000000 | | | | | | |
| 7 | 37.22778 | 5.80000 | 1.595274 | 1.604034 | 1.590539 | 1.599279 | 1.585920 | 67.87 | 1.002 |
| 8 | 310.91251 | 1.90000 | 1.516786 | 1.526319 | 1.511688 | 1.521121 | 1.506685 | 54.55 | 0.931 |
| 9 | 17.68050 | 5.10000 | 1.615215 | 1.625709 | 1.609541 | 1.620007 | 1.603937 | 58.54 | 1.003 |
| 10 | 21.11253 | 12.0000 | 1.000000 | | | | | | |
| 11 | ∞ | 11.00000 | 1.000000 | | | | | | |
| 12 | −20.17240 | 7.10000 | 1.529262 | 1.539627 | 1.523714 | 1.533973 | 1.518217 | 51.35 | 1.010 |
| 13 | −129.29627 | 6.10000 | 1.595274 | 1.604034 | 1.590539 | 1.599279 | 1.585920 | 67.87 | 1.002 |
| 14 | −35.61189 | 0.10000 | 1.000000 | | | | | | |
| 15 | −180.61420 | 6.40000 | 1.595274 | 1.604034 | 1.590539 | 1.599279 | 1.585920 | 67.87 | 1.002 |
| 16 | −31.31239 | 1.90000 | 1.529262 | 1.539627 | 1.523714 | 1.533973 | 1.518217 | 51.35 | 1.010 |
| 17 | −49.98169 | 0.10000 | 1.000000 | | | | | | |
| 18 | −238.02781 | 1.90000 | 1.518723 | 1.526703 | 1.514322 | 1.522384 | 1.509813 | 64.10 | 0.990 |
| 19 | 101.56610 | 5.10000 | 1.499260 | 1.505265 | 1.495980 | 1.502013 | 1.492728 | 82.52 | 0.995 |
| 20 | −137.43913 | 50.00000 | 1.000000 | | | | | | |
| 21 | ∞ | 0.80000 | 1.520327 | 1.529152 | 1.515556 | 1.524354 | 1.510818 | 58.90 | 1.003 |
| 22 | ∞ | 69.62380 | 1.000000 | | | | | | |

FIGS. 5A through 5E are graphs showing various aberrations (spherical aberration, astigmatism, distortion, lateral chromatic aberration and coma) of the imaging optical system according to Example 2 of the present invention. As is apparent from the respective graphs showing various aberrations, excellent correction is made over wide angle of view and superior imaging performance is obtained over wide wavelength range from 400 nm to 850 nm.

EXAMPLE 3

Figure 6:
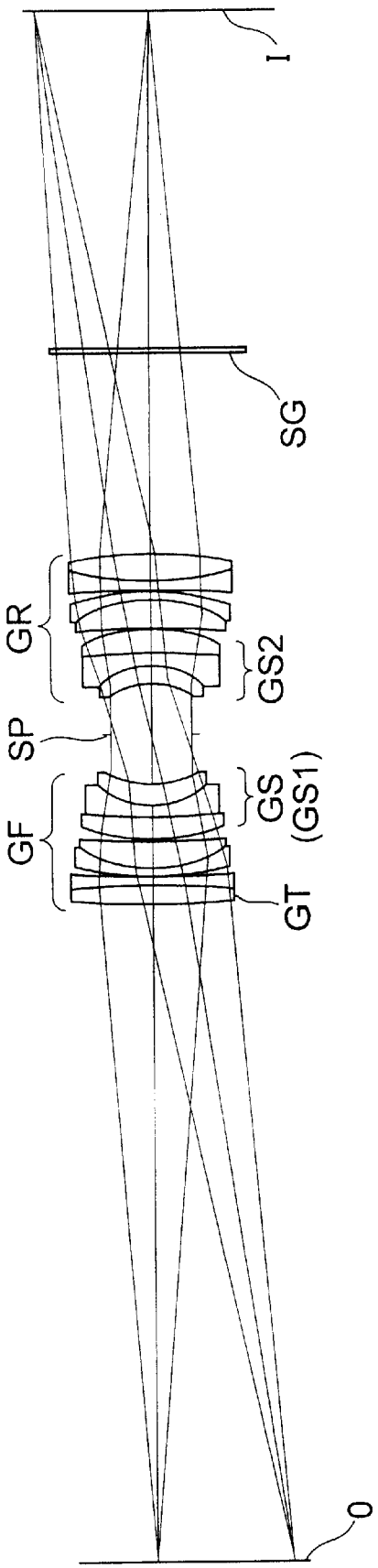
FIG. 6 is a drawing showing the construction of an imaging optical system according to Example 3 of the present invention.

FIG. 6 is a drawing showing the construction of an imaging optical system according to Example 3 of the present invention. The imaging optical system includes, in order from an object O to an image I, a front lens group GF having a positive refractive power, an aperture stop SP, a rear lens group GR having a positive refractive power, and a shield glass SG. The front lens group GF composed of a first lens component having a positive refractive power, a second lens component having a positive refractive power, and a third lens component having a negative refractive power. The rear lens group CR composed of a fourth lens component having a negative refractive power, a fifth lens component having a positive refractive power, a sixth lens component having a positive refractive power.

The first lens component is a cemented lens composed of, in order from the object, a double convex positive lens GT and a double concave negative lens. The second lens component is a cemented lens composed of, in order from the object, a negative meniscus lens having a convex surface facing to the object side, and a positive meniscus lens having a convex surface facing to the object side. The third lens component is a first triple cemented lens GS1 cemented with each other having a negative refractive power composed of, in order from the object, a positive meniscus lens having a convex surface facing to the object side, a negative meniscus lens having a convex surface facing to the object side, and a positive meniscus lens having a convex surface facing to the object side. The fourth lens component is a second triple cemented lens GS2 cemented with each other having a negative refractive power composed of, in order from the object, a positive meniscus lens having a concave surface facing to the object side, a negative meniscus lens having a concave surface facing to the object side, and a positive meniscus lens having a concave surface facing to the object side. The fifth lens component is a cemented lens composed of, in order from the object, a positive meniscus lens having a concave surface facing to the object side, and a negative meniscus lens having a concave surface facing to the object side. The sixth lens component is a cemented lens composed of, in order from the object, a double concave negative lens and a double convex positive lens.

Various values associated with Example 3 are listed in Table 3.

TABLE 3

| Surface | R | D | n(e) | n(g) | n(C) | n(F) | n(s) | νd | P |
|---|---|---|---|---|---|---|---|---|---|
| 0 | −1.00000 | 164.13500 | 1.000000 | | | | | | |
| 1 | 219.77254 | 5.00000 | 1.499260 | 1.505265 | 1.495980 | 1.502013 | 1.492728 | 82.52 | 0.995 |
| 2 | −148.18935 | 2.00000 | 1.518723 | 1.526703 | 1.514322 | 1.522384 | 1.509813 | 64.10 | 0.990 |
| 3 | 1750.97730 | 0.20000 | 1.000000 | | | | | | |
| 4 | 53.00255 | 2.00000 | 1.529262 | 1.539627 | 1.523714 | 1.533973 | 1.518217 | 51.35 | 1.010 |
| 5 | 27.99461 | 7.00000 | 1.595274 | 1.604034 | 1.590539 | 1.599279 | 1.585920 | 67.87 | 1.002 |
| 6 | 132.47971 | 0.20000 | 1.00000 | | | | | | |
| 7 | 37.69956 | 6.30000 | 1.595274 | 1.604034 | 1.590539 | 1.599279 | 1.585920 | 67.87 | 1.002 |
| 8 | 311.50498 | 2.00000 | 1.516786 | 1.526319 | 1.511688 | 1.521121 | 1.506685 | 54.55 | 0.931 |
| 9 | 18.49513 | 5.50000 | 1.595274 | 1.604034 | 1.590539 | 1.599279 | 1.585920 | 67.87 | 1.002 |
| 10 | 22.01468 | 12.50000 | 1.00000 | | | | | | |
| 11 | ∞ | 12.40000 | 1.00000 | | | | | | |
| 12 | −21.63225 | 5.40000 | 1.529262 | 1.539627 | 1.523714 | 1.533973 | 1.518217 | 51.35 | 1.010 |
| 13 | −17.30809 | 2.10000 | 1.549827 | 1.560219 | 1.544308 | 1.554544 | 1.538965 | 53.48 | 1.015 |
| 14 | −186.40078 | 6.50000 | 1.595274 | 1.604034 | 1.590539 | 1.599279 | 1.585920 | 67.87 | 1.002 |
| 15 | −37.62083 | 0.20000 | 1.000000 | | | | | | |
| 16 | −141.20924 | 7.00000 | 1.595274 | 1.604034 | 1.590539 | 1.599279 | 1.585920 | 67.87 | 1.002 |
| 17 | −28.30091 | 2.00000 | 1.529262 | 1.539627 | 1.523714 | 1.533973 | 1.518217 | 51.35 | 1.010 |
| 18 | −49.04503 | 0.20000 | 1.000000 | | | | | | |
| 19 | −1966.11190 | 2.00000 | 1.518723 | 1.526703 | 1.514322 | 1.522384 | 1.509813 | 64.10 | 0.990 |
| 20 | 54.10193 | 6.50000 | 1.499260 | 1.505265 | 1.495980 | 1.502013 | 1.492728 | 82.52 | 0.995 |
| 21 | −168.57398 | 50.00000 | 1.000000 | | | | | | |
| 22 | ∞ | 0.80000 | 1.520327 | 1.529152 | 1.515556 | 1.524354 | 1.510818 | 58.90 | 1.003 |
| 23 | ∞ | 83.04617 | | | | | | | |

FIGS. 7A through 7E are graphs showing various aberrations (spherical aberration, astigmatism, distortion, lateral chromatic aberration and coma) of the imaging optical system according to Example 3 of the present invention. As is apparent from the respective graphs showing various aberrations, excellent correction is made over wide angle of view and superior imaging performance is obtained over wide wavelength range from 400 nm to 850 nm.

Table 4 shows the values for the design conditions according to Examples 1 through 3.

TABLE 4

| | Example 1 | Example 2 | Example 3 |
|---|---|---|---|
| f | 99.804 | 97.015 | 103.013 |
| fs | −175.613 | −246.111 | −151.283 |
| LA | −0.015 | −0.123 | 0.070 |
| φR | 37.78 | 35.23 | 37.38 |
| β | −0.8664 | −0.8664 | −0.8664 |
| LD | 36.0 | 37.6 | 43.8 |
| fs1 | −231.054 | −246.111 | −282.437 |
| fs2 | −175.613 | | −151.283 |
| fT | 95.042 | 76.795 | 178.083 |
| RF | 20.7999 | 21.1125 | 22.0146 |
| RR | −19.3005 | −20.1724 | −21.632 |
| (1) |fs|/f | 1.7596 | 2.5368 | 1.4686 |
| (2) LD/(|β| · f) | 0.4165 | 0.4473 | 0.4909 |

TABLE 4-continued

|  | Example 1 | Example 2 | Example 3 |
|---|---|---|---|
| (3) φR/(\|β\| · \|fs\|) | 0.2484 | 0.1653 | 0.2853 |
| (4) LA/f | −0.00015 | −0.00127 | 0.00068 |
| (5) fs1/fs2 | 1.3157 |  | 1.8669 |
| (6) fT/f | 0.9253 | 0.7916 | 1.7287 |
| (7) \|RF/RR\| | 1.0777 | 1.0466 | 1.0177 |
| (8) Nu | 1.51679 | 1.51679 | 1.51679 |

Further, the present invention is explained with reference to accompanying drawings.

Figure 8:
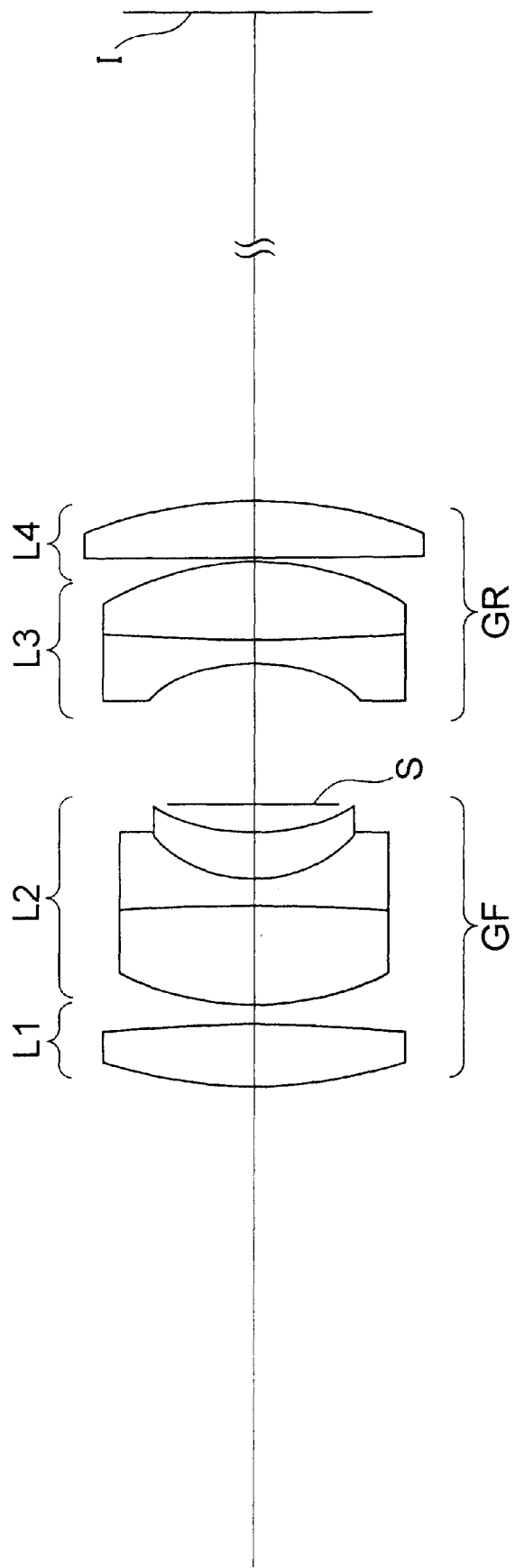
FIG. 8 is a drawing showing the construction of an imaging optical system according to Example 4 of the present invention.
Figure 10:
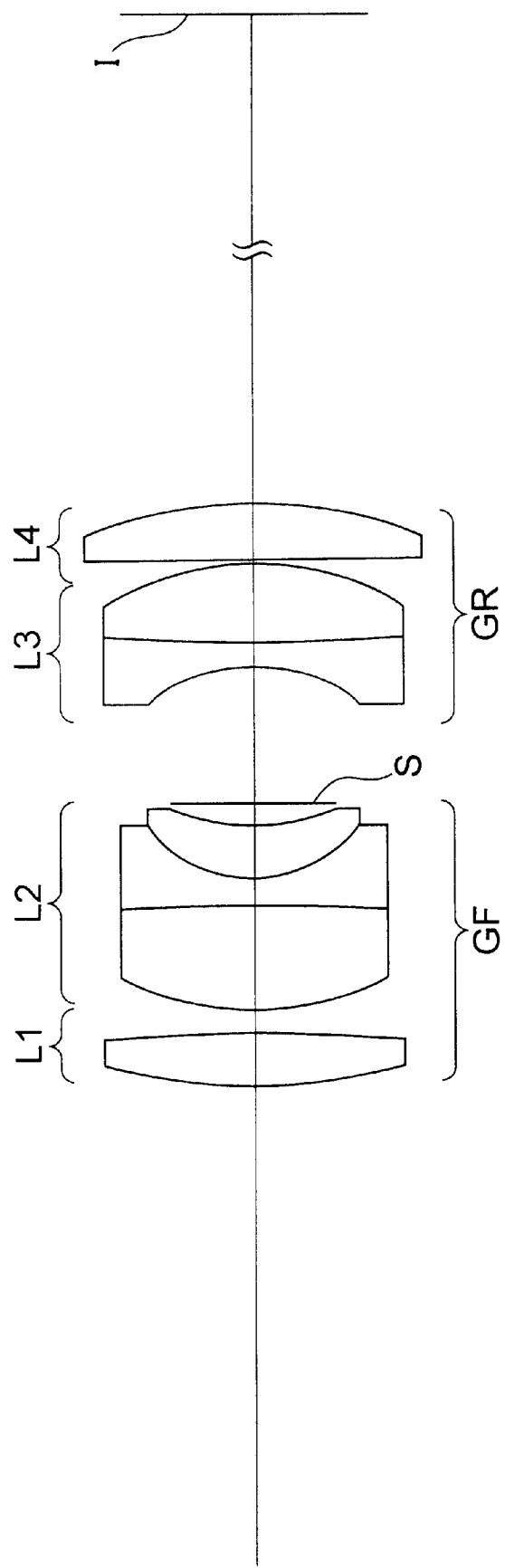
FIG. 10 is a drawing showing the construction of an imaging optical system according to Example 5 of the present invention.
Figure 12:
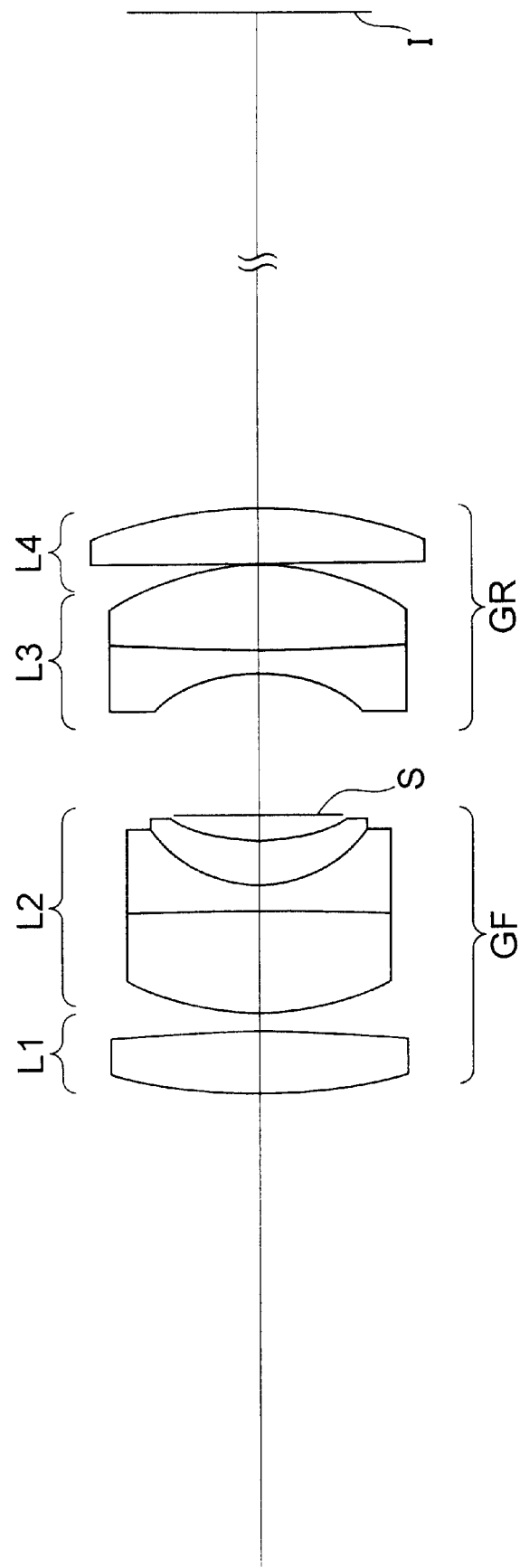
FIG. 12 is a drawing showing the construction of an imaging optical system according to Example 6 of the present invention.

FIGS. 8, 10, and 12 are drawings showing the construction of imaging optical systems according to Examples 4, 5, and 6, respectively, of the present invention.

As is shown in FIG. 8, the imaging optical system of the present invention includes, in order from an object, a front lens group GF having a positive refractive power, an aperture stop S (same as SP in the Example 1), and a rear lens group GR having a positive refractive power. The front lens group GF includes, in order from the object, a first lens component L1 having a positive refractive power, and a second lens component L2 having a negative refractive power cemented with at least two lens elements composed of positive and negative lenses wherein the second lens component L2 has a meniscus shape having a concave surface facing to the image side, and a lens element of the second lens component arranged closest to the aperture stop has a largest curvature surface in the second lens component away from the space where the aperture stop exists. The rear lens group GR includes, in order from the object, a third lens component L3 having a negative refractive power cemented with at least two lens elements composed of positive and negative lenses wherein the third lens component L3 has a meniscus shape having a concave surface facing to the object side, and a fourth lens component L4 having a positive refractive power with a meniscus shape having a concave surface facing to the object side. The following conditional expressions (9) and (10) are satisfied;

$$-0.01 < RSA/f < 0.01 \quad (9)$$

$$-0.0085 < LAM/f < 0.0085 \quad (10)$$

where RSA denotes the maximum value of spherical aberration at e-line, LAM denotes the maximum value of longitudinal chromatic aberration of the imaging optical system between 435.8 nm and 1014 nm as measured with respect to an e-line reference wavelength, and f denotes the focal length of the imaging optical system at e-line.

Moreover, in the present invention, in order to sufficiently correct chromatic aberration including the infrared wavelength range, it is quite effective that a positive lens is used at least one position among the two lens groups GF and GR locating the aperture stop S in between, wherein the positive lens is made of an anomalous dispersion glass material having Abbe number vd and refractive index at d-line ($\lambda$=587.6 nm) nd defined by the following conditional expressions (11) and (12):

$$65 < vd \quad (11)$$

$$1.40 < nd < 1.65 \quad (12).$$

In addition, when the lower limit of conditional expression (12) is set to 1.55, even better optical performance can be obtained.

Furthermore, when each of the two lens groups GF and GR between which the aperture stop S is located is composed of a cemented lens, and at least one positive lens made of an anomalous dispersion glass material is used for the cemented lens, it is preferable that a negative lens is used at least at one position among the two lens groups GF and GR, wherein the negative lens is made of an anomalous dispersion glass material having Abbe number vd and refractive index nd defined by the following conditional expressions (13) and (14):

$$35 < vd < 45 \quad (13)$$

$$1.60 < nd < 1.70 \quad (14).$$

In addition, when the lower and upper limit of conditional expression (9) are set to −0.0075 and 0.0075, respectively, even better optical performance can be obtained.

Moreover, in order to accomplish superior correction of chromatic aberration, it is desirable that each of the two lens groups GF and GR located the aperture stop S in between is constructed by a cemented lens.

In order to secure superior optical performance all over the image plane, it is indispensable to correct single chromatic aberration and longitudinal chromatic aberration as well as lateral chromatic aberration in the periphery of the image plane. Accordingly, while a ray passes through the cemented lens, production of chromatic aberration can be suppressed to the utmost.

If the second lens component L2, in particular, is composed of three lens elements, and the following conditional expression (15) is satisfied, then even better correction of chromatic aberration can be obtained:

$$0 - f2b/f < f2a/f < f2c/f \quad (15)$$

where f2a denotes the focal length of a lens element at e-line arranged to the most object side of the cemented lens, f2b denotes the focal length of a lens element at e-line arranged in the middle of the cemented lens, and f2c denotes the focal length of a lens element at e-line arranged to the most image side of the cemented lens.

Moreover, when the lens element arranged to the most image side has a meniscus shape, even better optical performance can be obtained.

In addition, when the following conditional expression (16) is satisfied, various aberrations can be corrected well, so that even better optical performance can be obtained:

$$0.25 < DS/DT < 0.4 \quad (16)$$

where DT denotes the distance along the optical axis between the most object side lens surface and the most image side lens surface of the imaging optical system, and DS denotes the distance along the optical axis between the most object side lens surface and the most image side lens surface of the second lens component L2.

When the ratio DS/DT falls below the lower limit of conditional expression (16), the secondary spectrum becomes large, so that chromatic aberration becomes worse. On the other hand, when the ratio exceeds the upper limit of conditional expression (16), the thickness of the second lens element becomes too large, so that it becomes difficult to fabricate.

In addition, when the second lens component L2 is composed of three lens elements, and the following conditional expressions (17) and (18) are satisfied, chromatic aberration can be corrected well:

$$0.5 < DA/DS < 0.8 \quad (17)$$

$$0.1 < DB/DS < 0.4 \quad (18)$$

where DA denotes the thickness along the optical axis of a lens element arranged to the most object side of the second lens component L2, and DB denotes that of a lens arranged in the middle.

When both ratios DA/DS and DB/DS exceed the respective upper limits of conditional expressions (17) and (18), chromatic aberration can be corrected well, but the other aberrations become worse. On the other hand, when both ratios fall below the respective lower limits of conditional expressions (17) and (18), chromatic aberration cannot be corrected well.

As stated above, by using so-called "Gauss type" lens construction, an imaging optical system having a large-relative aperture, and well corrected distortion as well as chromatic aberration. In particular, spherical aberration at different wavelength can be corrected well.

When conditional expression (9) is satisfied, a clear image can be obtained. When conditional expression (10) is satisfied, chromatic aberration in the infrared wavelength range can be kept in good condition. When the ratio RSA/f exceeds the scope of conditional expression (9), spherical aberration becomes too large, so that the image becomes low contrast. When the ratio LAM/f exceeds the scope of conditional expression (10), correction of chromatic aberration becomes worse, so that the image plane in the visible wavelength range and that in the infrared wavelength range come to separate with each other. As a result, the purpose of the invention cannot be satisfied anymore.

Conditional expressions (11) and (12) are for well correcting chromatic aberration. By using an anomalous dispersion glass material to a positive lens, correction of chromatic aberration in wide wavelength range can be obtained. When the value vd and nd exceed the scope of conditional expressions (11) and (12), the property of anomalous dispersion is lost from the glass material, so that correction of chromatic aberration cannot be performed sufficiently.

Conditional expressions (13) and (14) are also for well correcting chromatic aberration. In particular, these expressions are preferably applied to a negative lens element located adjacent to the positive lens element that conditional expressions (11) and (12) are applied. When the value vd and nd exceed the scope of conditional expressions (13) and (14), the property of anomalous dispersion is lost from the glass material, so that correction of chromatic aberration cannot be performed sufficiently.

Moreover, by satisfying the following conditional expression (15), each aberration can be corrected well:

$$0 < -f2b/f < f2a/f < f2c/f \quad (15).$$

Then, further, Examples of the present invention are explained.

Figures 11A, 11B, 11C:
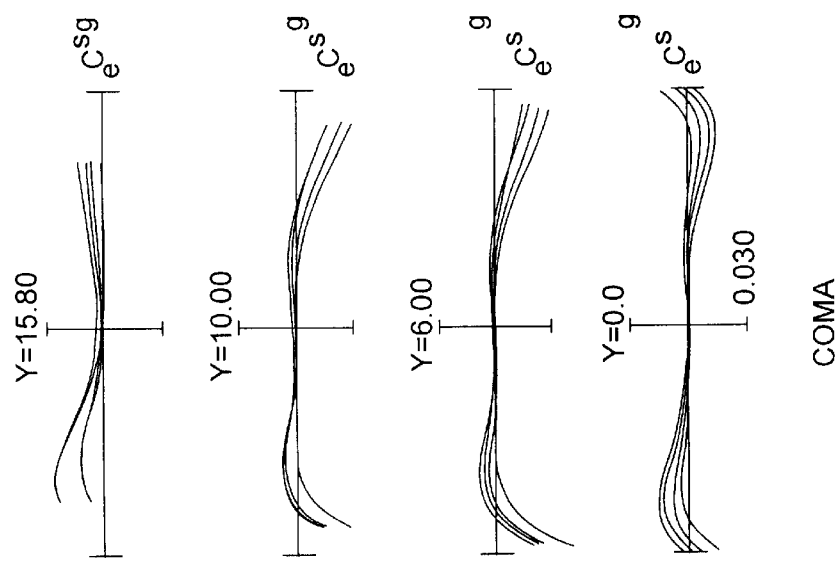
FIGS. 11A through 11E are graphs showing various aberrations of the imaging optical system according to Example 5.
Figure 11D:
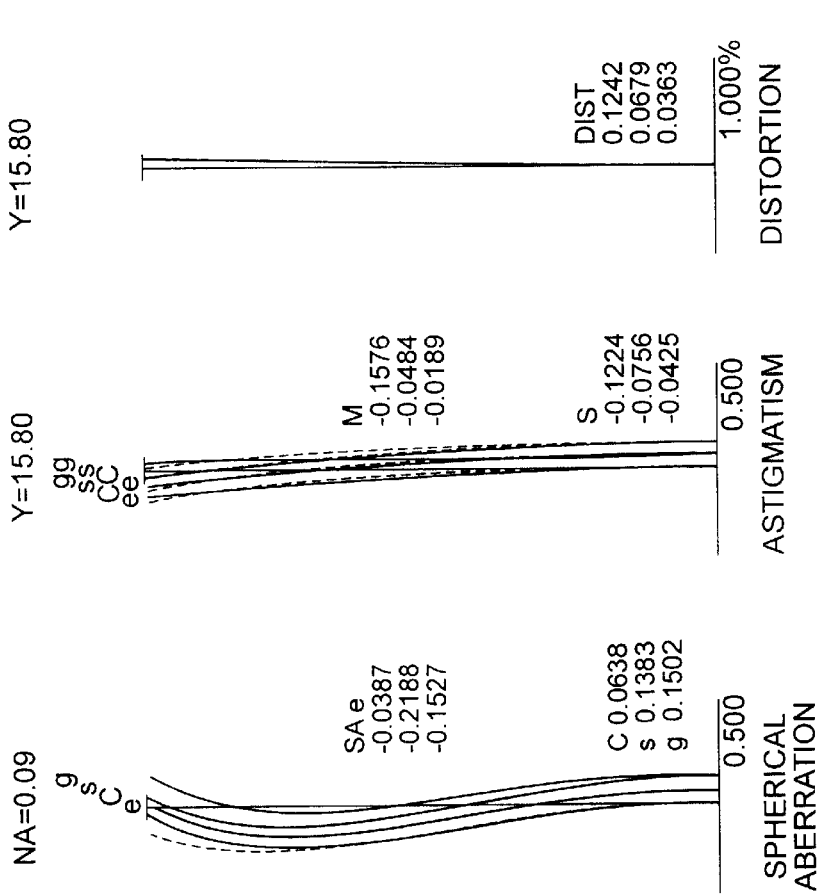
Figure 11E:
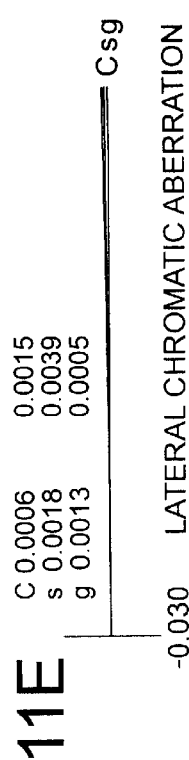

Various values of an imaging optical system according to Example 4, 5, and 6 are shown in Table 5, 6, and 7, respectively. Spherical aberration, astigmatism, distortion, and lateral chromatic aberration of the imaging optical system according to Example 4, 5, and 6 are shown in FIGS. 9, 11, and 13, respectively.

FIGS. 8, 10, and 12, are imaging optical systems according to Example 4, 5, and 6, respectively.

Each imaging optical system is composed of, in order from an object O to an image I, a front lens group GF having a positive refractive power, an aperture stop S, and a rear lens group GR. The front lens group GF is composed of a first lens component L1 having a positive refractive power and a second lens component L2 having a negative refractive power. The rear lens group GR is composed of a third lens component L3 having a negative refractive power and a fourth lens component L4 having a positive refractive power.

The first lens component L1 is composed of a double convex positive lens. The second lens component L2 is a triple cemented lens having a negative refractive power composed of, in order from the object, a double convex positive lens, a double concave negative lens, and a positive meniscus lens having a convex surface facing to the object side. The third lens component L3 is a cemented lens composed of, in order from the object, a double concave negative lens and a double convex positive lens. The fourth lens component L4 is composed of a positive meniscus lens having a convex surface facing to the object side.

EXAMPLE 4

Table 5 shows various values of the imaging optical system according to Example 4 of the present invention. In Table 5, surface number denotes an optical surface number counted in order from the object, R denotes a radius of curvature of the optical surface, D denotes a distance to the next optical surface along the optical axis, vd denotes Abbe number of the medium arranged between the optical surface and the next optical surface, n(e) denotes refractive index at e-line ($\lambda$=546.1 nm), n(s) denotes refractive index at s-line ($\lambda$=852.1 nm), n(C) denotes refractive index at C-line ($\lambda$=656.3 nm), n(d) denotes refractive index at d-line ($\lambda$=587.6 nm), n(g) denotes refractive index at g-line ($\lambda$=435.8 nm), and the refractive index value of air 1.00000 is abbreviated.

Moreover, RSA denotes the maximum value of spherical aberration at e-line, LAM denotes the maximum value of longitudinal chromatic aberration of the imaging optical system between 435.8 nm and 1014 nm including 852.1 nm as measured with respect to an e-line reference wavelength, and f denotes the focal length of the imaging optical system at e-line. In the second lens component L2 locating to the object side of the aperture stop, refractive index and Abbe number of the glass material of the most object side positive lens are denoted by nd2 and v2, respectively Those of the negative lens are denoted by nd3 and v3, respectively. In the third lens component L3 located to the image side of the aperture stop, refractive index and Abbe number of the glass material of the positive lens are nd2 and v2, respectively. Those of the negative lens are also nd3 and v3, respectively. The respective values are listed in Table 5.

Moreover, DT denotes the distance along the optical axis between the most object side lens surface and the most image side lens surface, and DS denotes the distance along the optical axis between the most object side lens surface and the most image side lens surface of the second lens component L2. The second lens component L2 is composed of a triple cemented lens. The thickness of the most object side lens of the second lens component L2 along the optical axis is denoted by DA, and that of the middle lens of the second lens component L2 is denoted by DB. The respective values are listed in Table 5.

The description according to Example 4 described above and reference symbols shown in Table 5 are same in the following Examples 5 and 6.

TABLE 5

| Surface | R | D | vd | n(e) | n(s) | n(C) | n(d) | n(g) |
|---|---|---|---|---|---|---|---|---|
| 0) | −1.25400 | 60.80090 | | | | | | |
| 1) | 30.79565 | 3.60000 | 67.87 | 1.59527 | 1.58592 | 1.59054 | 1.59319 | 1.60403 |
| 2) | −183.18135 | 1.30000 | | | | | | |
| 3) | 17.10365 | 6.10000 | 67.87 | 1.59527 | 1.58592 | 1.59054 | 1.59319 | 1.60403 |
| 4) | −99.90600 | 1.50000 | 39.69 | 1.65803 | 1.64081 | 1.64921 | 1.65412 | 1.67510 |
| 5) | 7.80140 | 2.80000 | 38.18 | 1.65532 | 1.63796 | 1.64627 | 1.65128 | 1.67323 |
| 6) | 12.11638 | 1.50000 | | | | | | |
| 7> | ∞ | 8.50000 | (Aperture stop) | | | | | |
| 8) | −9.56086 | 1.30000 | 39.69 | 1.65803 | 1.64081 | 1.64921 | 1.65412 | 1.67510 |
| 9) | 113.74700 | 5.20000 | 67.87 | 1.59527 | 1.58592 | 1.59054 | 1.59319 | 1.60403 |
| 10) | −15.13224 | 0.10000 | | | | | | |
| 11) | −603.51073 | 3.50000 | 47.92 | 1.72056 | 1.70488 | 1.71253 | 1.71700 | 1.73587 |
| 12) | −24.82567 | 73.12531 | | | | | | |

(Values corresponding to the conditions)

| | Example 4 |
|---|---|
| RSA | −0.214 |
| LAM | 0.157 |
| f | 46.18 |
| RSA/f | −0.0046 |
| LAM/f | 0.0034 |
| nd2 | 1.59319 |
| vd2 | 67.87 |
| nd3 | 1.65412 |
| vd3 | 39.69 |
| DT | 35.4 |
| DS | 10.4 |
| DA | 6.1 |
| DB | 1.5 |
| DS/DT | 0.29 |
| DA/DS | 0.587 |
| DB/DS | 0.144 |
| f2a | 25.019 |
| f2b | −10.937 |
| f2c | 26.596 |
| fs | −122.935 |

FIGS. 9A–9E are graphs showing various aberrations of the imaging optical system according to the Example 4. In the respective graphs, NA denotes a numerical aperture, Y denotes an image height, g denotes an aberration curve at g-line (λ=435.8 nm), e denotes that at e-line (λ=546.1 nm), C denotes that at C-line (λ=656.3 nm), and s denotes that at s-line (λ=852.1 nm). In the graphs showing astigmatism, a broken line indicates a meridional image plane and a solid line indicates a sagittal image plane.

In FIG. 9A showing spherical aberrations, three-lined numeral values shown in the central portion followed "SA e" are values of spherical aberration at e-line. In order from the first line, spherical aberration at the maximum NA (NA=0.09) is 0.0119, that at 70% of the maximum NA (NA=0.063) is −0.2137, and that at 50% of the maximum NA (NA=0.045) is −0.1537. In the same way, three-lined numeral values shown in the lower portion are longitudinal chromatic aberrations. In order from the first line, longitudinal chromatic aberration at C-line is 0.0739, that at s-line is 0.1574, and that at g-line is 0.1294.

In FIG. 9B showing astigmatism, three-lined numeral values shown in the central portion followed "M" are values of meridional image plane at e-line. In order from the first line, the value at the maximum image height (Y=15.80) is −0.1656, that at 70% of the maximum image height (Y=11.06) is −0.0593, and that at 50% of the maximum image height (Y=7.90) is −0.0260. In the same way, three-lined numeral values shown in the lower portion followed "S" are values of sagittal image plane at e-line. In order from the first line, the value at the maximum image height (Y=15.80) is −0.1324, that at 70% of the maximum image height (Y=11.06) is −0.0815, and that at 50% of the maximum image height (Y=7.90) is −0.0457.

In FIG. 9C showing distortion, three-lined numeral values shown in the lower portion followed "DIST" are values of distortion at e-line. In order from the first line, the value at the maximum image height (Y=15.80) is 0.1431, that at 70% of the maximum image height (Y=11.06) is 0.0767, and that at 50% of the maximum image height (Y=7.90) is 0.0406.

In FIG. 9D showing lateral chromatic aberration, three-lined numeral values shown in the right column are values of lateral chromatic aberration at the maximum image height (Y=15.80). In order from the first line, the value at C-line is 0.0004, that at s-line is 0.0018, and that at g-line is 0.0027. In the same way, three-lined numeral values shown in the left column are values of lateral chromatic aberration at 70% of the maximum image height (Y=11.06). In order from the first line, the value at C-line is −0.0001, that at s-line is 0.0005, and that at g-line is 0.0027.

In graphs showing various aberrations in the following Examples 5 and 6, the sama notation as Example 4 is used.

As is apparent from FIGS. 9A-9E, various aberrations are corrected well and superior imaging performance is obtained from g-line (visible light range) through s-line (near infrared light range).

EXAMPLE 5

Various values of an imaging optical system according to Example 5 are listed in Table 6.

TABLE 6

| Surface | R | D | vd | n(e) | n(s) | n(C) | n(d) | n(g) |
|---|---|---|---|---|---|---|---|---|
| 0) | −1.25400 | 60.49928 | | | | | | |
| 1) | 32.82211 | 3.30000 | 67.87 | 1.59527 | 1.58592 | 1.59054 | 1.59319 | 1.60403 |
| 2) | −158.35126 | 1.90000 | | | | | | |
| 3) | 16.73286 | 6.10000 | 67.87 | 1.59527 | 1.58592 | 1.59054 | 1.59319 | 1.60403 |
| 4) | −89.93069 | 1.50000 | 39.69 | 1.65803 | 1.64081 | 1.64921 | 1.65412 | 1.67510 |
| 5) | 7.76100 | 2.80000 | 38.18 | 1.65532 | 1.63796 | 1.64627 | 1.65128 | 1.67323 |
| 6) | 11.97939 | 1.50000 | | | | | | |
| 7> | ∞ | 8.50000 | (Aperture stop) | | | | | |
| 8) | −9.62378 | 1.30000 | 39.69 | 1.65803 | 1.64081 | 1.64921 | 1.65412 | 1.67510 |
| 9) | 113.72428 | 5.20000 | 67.87 | 1.59527 | 1.58592 | 1.59054 | 1.59319 | 1.60403 |
| 10) | −15.22350 | 0.10000 | | | | | | |
| 11) | −645.19078 | 3.40000 | 47.92 | 1.72056 | 1.70488 | 1.71253 | 1.71700 | 1.73587 |
| 12) | −24.60538 | 73.41677 | | | | | | |

(Values corresponding to the conditions)

| | Example 5 |
|---|---|
| RSA | −0.219 |
| LAM | 0.150 |
| f | 46.365 |
| RSA/f | −0.00472 |
| LAM/f | 0.00324 |
| nd2 | 1.59319 |
| vd2 | 67.87 |
| nd3 | 1.65412 |
| vd3 | 39.69 |
| DT | 35.6 |
| DS | 10.4 |
| DA | 6.1 |
| DB | 1.5 |
| DS/DT | 0.29 |
| DA/DS | 0.587 |
| DB/DS | 0.144 |
| f2a | 24.217 |
| f2b | −10.792 |
| f2c | 26.633 |
| fs | −130.878 |

FIGS. 11A–11E are graphs showing various aberrations of the imaging optical system according to the Example 5.

As is apparent from FIGS. 11A–11E, various aberrations are corrected well and superior imaging performance is obtained from g-line (visible light range) through s-line (near infrared light range).

EXAMPLE 6

Various values of an imaging optical system according to Example 6 are listed in Table 7.

TABLE 7

| Surface | R | D | vd | n(e) | n(s) | n(C) | n(d) | n(g) |
|---|---|---|---|---|---|---|---|---|
| 0) | −1.25400 | 60.80327 | | | | | | |
| 1) | 30.82309 | 3.60000 | 67.87 | 1.59527 | 1.58592 | 1.59054 | 1.59319 | 1.60403 |
| 2) | −182.77199 | 1.20000 | | | | | | |
| 3) | 17.10931 | 6.30000 | 68.27 | 1.58990 | 1.58035 | 1.58519 | 1.58784 | 1.59839 |
| 4) | −99.91051 | 1.50000 | 39.63 | 1.65803 | 1.64081 | 1.64921 | 1.65412 | 1.67510 |
| 5) | 7.80000 | 2.90000 | 38.18 | 1.65532 | 1.63796 | 1.64627 | 1.65128 | 1.67323 |
| 6) | 12.11317 | 1.50000 | | | | | | |
| 7> | ∞ | 8.50000 | (Aperture stop) | | | | | |
| 8) | −9.57508 | 1.30000 | 39.63 | 1.65803 | 1.64081 | 1.64921 | 1.65412 | 1.67510 |
| 9) | 113.82233 | 5.20000 | 68.27 | 1.58990 | 1.58035 | 1.58519 | 1.58784 | 1.59839 |
| 10) | −15.14809 | 0.10000 | | | | | | |

TABLE 7-continued

| 11) | −601.07281 | 3.50000 | 47.92 | 1.72056 | 1.70488 | 1.71253 | 1.71700 | 1.73587 |
| 12) | −24.82086 | 75.16351 | | | | | | |

(Values corresponding to the conditions)

| | Example 6 |
|---|---|
| RSA | −0.231 |
| LAM | 0.334 |
| f | 46.584 |
| RSA/f | −0.00496 |
| LAM/f | 0.00716 |
| nd2 | 1.58784 |
| vd2 | 68.27 |
| nd3 | 1.65412 |
| vd3 | 39.63 |
| DT | 35.6 |
| DS | 10.7 |
| DA | 6.3 |
| DB | 1.5 |
| DS/DT | 0.301 |
| DA/DS | 0.589 |
| DB/DS | 0.140 |
| f2a | 25.268 |
| f2b | −10.935 |
| f2c | 26.400 |
| fs | −120.993 |

FIGS. 13A–13E are graphs showing various aberrations of the imaging optical system according to the Example 6.

As is apparent from FIGS. 13A–13E, various aberrations are corrected well and superior imaging performance is obtained from g-line (visible light range) through s-line (near infrared light range).

Furthermore, an imaging optical system according to the present invention can be applied to other than the scanner, for example, a photographing system using an infrared film.

As described above, the present invention makes it possible to provide an imaging optical system for a finite distant object having superior imaging performance with well corrected chromatic aberration not only in the visible wavelength range but also in the near infrared wavelength range.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents

What is claimed is:

1. An imaging optical system comprising, in order from an object:

a front lens group with a positive refractive power;

an aperture stop; and a rear lens group with a positive refractive power; and wherein the front lens group includes, at the most object side thereof, a double convex positive lens;

wherein at least one of the front lens group and the rear lens group includes a triple cemented lens being adjacent to the aperture stop having a negative refractive power as a whole composed of a first positive lens, a negative lens, and a second positive lens; and wherein the following conditional expression is satisfied;

$$0.3 < |fs|/f < 5.0 \quad (1)$$

where fs denotes the focal length of the cemented lens at e-line ($\lambda$=546.07 nm) and f denotes the focal length of the imaging optical system at e-line.

2. The imaging optical system according to claim 1;

wherein at least one of the positive lenses of the cemented lens is made of a glass material having Abbe number vd of 65 or more and also the partial dispersion ratio P of 0.8 or more;

wherein the cemented lens has a meniscus lens arranged closest to the aperture stop having a largest curvature surface in the cemented lens away from the space where the aperture stop exists; and wherein the following conditional expression is satisfied;

$$0.1 < LD/(|\beta| \cdot f) < 4 \quad (2)$$

where LD denotes the total sum of the thickness along the optical axis of the positive lenses made of the glass material having Abbe number vd of 65 or more and also the partial dispersion ratio P of 0.8 or more, P denotes the partial dispersion ratio (ng-ne)/(nF-nC), ng denotes refractive index at g-line ($\lambda$=435.84 nm), ne denotes refractive index at e-line($\lambda$=546.07 nm), nF denotes refractive index at F-line($\lambda$=486.13 nm), nC denotes refractive index at C-line ($\lambda$=656.27 nm), and $\beta$ denotes the imaging magnification of the imaging optical system at e-line.

3. The imaging optical system according to claim 2;

wherein at least two positive lenses, whose glass material has Abbe number vd of 65 or more and also the partial dispersion ratio P of 0.8 or more, are arranged to both object side and image side of the aperture stop; and wherein the following conditional expressions are satisfied;

$$0.03 < \Phi R/(|\beta| \cdot |fs|) < 3 \quad (3)$$

$$-0.01 < LA/f < 0.01 \quad (4)$$

where $\Phi R$ denotes the effective diameter of the most-image-side lens, and LA denotes an amount of longitudinal chromatic aberration of the imaging optical system at s-line (λ=852.11 nm) as measured with respect to an e-line reference wavelength.

4. The imaging optical system according to claim 3;
wherein a first cemented lens and a second cemented lenses having a negative refractive power as a whole are arranged adjacent to the object side and the image side, respectively, of the aperture stop;
wherein each of the first cemented lens and the second cemented lens is a triple cemented lens composed of a first positive lens, a negative lens, and a second positive lens;
wherein the most aperture stop side lens of each cemented lens is a positive meniscus lens; and
wherein the following conditional expression is satisfied:

$$0.5 < fs1/fs2 < 3.0 \quad (5)$$

where fs1 denotes the focal length at e-line of the first cemented lens arranged to the object side of the aperture stop and fs2 denotes the focal length at e-line of the second cemented lens arranged to the image side of the aperture stop.

5. The imaging optical system according to claim 2;
wherein a first cemented lens and a second cemented lens having a negative refractive power as a whole are arranged adjacent to the object side and the image side, respectively, of the aperture stop;
wherein each of the first and second cemented lenses is a triple cemented lens composed of a first positive lens, a negative lens, and a second positive lens;
wherein the most aperture stop side lens of each cemented lens is a positive meniscus lens; and wherein the following conditional expression is satisfied;

$$0.5 < fs1/fs2 < 3.0 \quad (5)$$

wherein fs1 denotes the focal length at e-line of the first cemented lens arranged to the object side of the aperture stop and fs2 denotes the focal length at e-line of the second cemented lens arranged to the image side of the aperture stop.

6. The imaging optical system according to claim 1;
wherein at least two positive lenses, whose glass material has Abbe number vd of 65 or more and also the partial dispersion ratio P of 0.8 or more, are arranged to both object side and image side of the aperture stop; and
wherein the following conditional expressions are satisfied;

$$0.03 < \Phi R/(|\beta| \cdot |fs|) < 3 \quad (3)$$

$$-0.01 < LA/f < 0.01 \quad (4)$$

where ΦR denotes the effective diameter of the most-image-side lens, and LA denotes an amount of longitudinal chromatic aberration of the imaging optical system at s-line (λ=852.11 nm) as measured with respect to an e-line reference wavelength.

7. The imaging optical system according to claim 6;
wherein a first cemented lens and a second cemented lens having a negative refractive power as a whole are arranged adjacent to the object side and the image side, respectively, of the aperture stop;
wherein each of the first and second cemented lenses is a triple cemented lens composed of a first positive lens, a negative lens, and a second positive lens;

wherein the most aperture stop side lens of each cemented lens is a positive meniscus lens; and
wherein the following conditional expression is satisfied;

$$0.5 fs1/fs2 < 3.0 \quad (5)$$

wherein fs1 denotes the focal length at e-line of the first cemented lens arranged to the object side of the aperture stop and fs2 denotes the focal length at e-line of the second cemented lens arranged to the image side of the aperture stop.

8. The image optically system according to claim 1;
wherein a first cemented lens and a second cemented lens having a negative refractive power as a whole are arranged adjacent to the object side and the image side, respectively, of the aperture stop;
wherein each first and second cemented lenses is a triple cemented lens composed of a first positive lens, a negative lens, and a second positive lens;
wherein the most aperture stop side lens of each cemented lens is a positive meniscus lens; and
wherein the following conditional expression is satisfied;

$$0.5 < fs1/fs2 < 3.0 \quad (5)$$

where fs1 denotes the focal length at e-line of the first cemented lens arranged to the object side of the aperture stop and fs2 denotes the focal length at e-line of the second cemented lens arranged to the image side of the aperture stop.

9. An imaging optical system comprising, in order from an object:
a front lens group having a positive refractive power;
an aperture stop; and
a rear lens group having a positive refractive power; and
wherein the front lens group includes, in order from the object;
a first lens component having a positive refractive power; and
a second lens component having a negative refractive power and including at least two lens elements having, respectively, a positive and negative power, all lens elements of the second lens component being cemented together, wherein the second lens component has a meniscus shape having a concave surface facing to the image side, and a lens element of the second lens component arranged closest to the aperture stop has a largest curvature surface in the second lens component away from the space where the aperture stop exists;
wherein the rear lens group includes, in order from the object;
a third lens component having a negative refractive power and including at least two lens elements having, respectively, a negative and positive power, all lens elements of the third lens component being cemented together, wherein the third lens component has a meniscus shape having a concave surface facing to the object side; and
a fourth lens component having a positive refractive power with a meniscus shape having a concave surface facing to the object side; and
wherein the following conditional expressions are satisfied;

$$-0.01 < RSA/f < 0.01 \quad (9)$$

$$-0.0085 < LAM/f < 0.0085 \quad (10)$$

where RSA denotes the maximum value of spherical aberration at e-line ($\lambda=546.07$ nm), LAM denotes the maximum value of longitudinal chromatic aberration of the imaging optical system between 435.8 nm and 1014 nm as measured with respect to an e-line reference wavelength, and f denotes the focal length of the imaging optical system at e-line.

10. The imaging optical system according to claim 9; wherein a positive lens made of a glass material satisfying the following conditional expressions is used as at least one lens element in the two lens groups between which the aperture stop of the imaging optical system is located;

$$65 \nu d \quad (11)$$

$$1.40 < nd < 1.65 \quad (12)$$

where $\nu d$ denotes Abbe number and nd denotes refractive index at d-line ($\lambda=587.6$ nm).

11. The imaging optical system according to claim 10; wherein a negative lens made of a glass material satisfying the following conditional expressions is used as at least one lens element in the two lens groups between which the aperture stop of the imaging optical system is located;

$$35 < \nu d < 45 \quad (13)$$

$$1.60 < nd < 1.70 \quad (14).$$

12. The imaging optical system according to claim 11;

wherein when the second lens component is composed of three lens elements, the following conditional expression is satisfied;

$$0 < -f2b/f < f2a/f < f2c/f \quad (15)$$

where f2a denotes the focal length of a lens element at e-line located at the most object side of the second lens component, f2b denotes the focal length of a lens element at e-line located at the middle of the second lens component, f2c denotes the focal length of a lens element at e-line located at the most image side of the second lens component, and f denotes the focal length of the imaging optical system.

13. The imaging optical system according to claim 10; wherein when the second lens component is composed of three lens elements, the following conditional expression is satisfied;

$$0 < -f2b/f < f2a/f < f2c/f \quad (15)$$

where f2a denotes the focal length of a lens element at e-line located at the most object side of the second lens component, f2b denotes the focal length of a lens element at e-line located at the middle of the second lens component, f2c denotes the focal length of a lens element at e-line located at the most image side of the second lens component, and f denotes the focal length of the imaging optical system.

14. The imaging optical system according to claim 9; wherein a negative lens made of a glass material satisfying the following conditional expressions is used as at least one lens element in the two lens groups between which the aperture stop of the imaging optical system is located;

$$35 < \nu d < 45 \quad (13)$$

$$1.60 < nd < 1.70 \quad (14)$$

where $\nu d$ denotes Abbe number and nd denotes refractive index at d-line ($\lambda=587.6$ nm).

15. The imaging optical system according to claim 14; wherein when the second lens component is composed of three lens elements, the following conditional expression is satisfied;

$$0 < -f2b/f < f2a/f < f2c/f \quad (15)$$

where f2a denotes the focal length of a lens element at e-line located at the most object side of the second lens component, f2b denotes the focal length of a lens element at e-line located at the middle of the second lens component, f2c denotes the focal length of a lens element at e-line located at the most image side of the second lens component, and f denotes the focal length of the imaging optical system.

16. The imaging optical system according to claim 9; wherein when the second lens component is composed of three lens elements, the following conditional expression is satisfied;

$$0 < -f2b/f < f2a/f < f2c/f \quad (15)$$

where f2a denotes the focal length of a lens element at e-line located at the most object side of the second lens component, f2b denotes the focal length of a lens element at e-line located at the middle of the second lens component, f2c denotes the focal length of a lens element at e-line located at the most image side of the second lens component, and f denotes the focal length of the imaging optical system.

* * * * *